(12) United States Patent
Wang et al.

(10) Patent No.: US 10,068,689 B2
(45) Date of Patent: Sep. 4, 2018

(54) IRON NITRIDE PERMANENT MAGNET AND TECHNIQUE FOR FORMING IRON NITRIDE PERMANENT MAGNET

(75) Inventors: Jian-Ping Wang, Shoreview, MN (US); Shihai He, Fremont, CA (US); Yanfeng Jiang, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 801 days.

(21) Appl. No.: 14/238,835

(22) PCT Filed: Aug. 17, 2012

(86) PCT No.: PCT/US2012/051382
§ 371 (c)(1),
(2), (4) Date: Jun. 9, 2014

(87) PCT Pub. No.: WO2013/026007
PCT Pub. Date: Feb. 21, 2013

(65) Prior Publication Data
US 2014/0299810 A1 Oct. 9, 2014

Related U.S. Application Data

(60) Provisional application No. 61/524,423, filed on Aug. 17, 2011.

(51) Int. Cl.
| | |
|---|---|
| H01F 1/01 | (2006.01) |
| B32B 15/01 | (2006.01) |
| C21D 1/76 | (2006.01) |
| C23C 8/26 | (2006.01) |
| C23C 8/80 | (2006.01) |
| C22C 38/00 | (2006.01) |
| H01F 1/047 | (2006.01) |
| H01F 41/02 | (2006.01) |
| B22D 11/06 | (2006.01) |
| H01F 7/02 | (2006.01) |

(52) U.S. Cl.
CPC ............ *H01F 1/01* (2013.01); *B22D 11/0622* (2013.01); *B22D 11/0651* (2013.01); *B32B 15/011* (2013.01); *C21D 1/76* (2013.01); *C22C 38/001* (2013.01); *C23C 8/26* (2013.01); *C23C 8/80* (2013.01); *H01F 1/047* (2013.01); *H01F 7/021* (2013.01); *H01F 41/0253* (2013.01); *H01F 41/0273* (2013.01)

(58) Field of Classification Search
CPC ...................................................... H01F 1/01
See application file for complete search history.

(56) References Cited

U.S. PATENT DOCUMENTS

| | | | |
|---|---|---|---|
| 5,032,947 A | 7/1991 | Li et al. | |
| 5,068,147 A | 11/1991 | Hori et al. | |
| 5,137,588 A | 8/1992 | Wecker et al. | |
| 5,330,554 A | 7/1994 | Koyano et al. | |
| 5,449,417 A | 9/1995 | Shimizu et al. | |
| 6,139,765 A | 10/2000 | Kitazawa et al. | |
| 6,217,672 B1 | 4/2001 | Zhang | |
| 6,319,485 B1 | 11/2001 | Nagatomi et al. | |
| 6,457,629 B1 | 10/2002 | White | |
| 6,778,358 B1 | 8/2004 | Jiang et al. | |
| 6,841,259 B1 | 1/2005 | Takahashi et al. | |
| 7,238,439 B2 | 7/2007 | Sasaki et al. | |
| 2002/0117102 A1 | 8/2002 | Takahashi et al. | |
| 2002/0191354 A1 | 12/2002 | Yoshikawa et al. | |
| 2002/0197530 A1 | 12/2002 | Tani et al. | |
| 2005/0208320 A1 | 9/2005 | Masada et al. | |
| 2006/0105170 A1 | 5/2006 | Dobson et al. | |
| 2006/0112873 A1 | 6/2006 | Uchida et al. | |
| 2008/0166584 A1 | 7/2008 | Deligianni et al. | |
| 2009/0042063 A1 | 2/2009 | Inoue et al. | |
| 2009/0087688 A1 | 4/2009 | Masaki | |
| 2010/0035086 A1 | 2/2010 | Inoue et al. | |
| 2010/0104767 A1 | 4/2010 | Sskuma et al. | |
| 2010/0288964 A1 | 11/2010 | Pinch et al. | |
| 2011/0059005 A1 | 3/2011 | Sankar et al. | |
| 2011/0074531 A1 | 3/2011 | Yamashita et al. | |
| 2012/0090543 A1 | 4/2012 | Cheong | |
| 2012/0145944 A1 | 6/2012 | Komuro et al. | |

(Continued)

FOREIGN PATENT DOCUMENTS

| | | |
|---|---|---|
| CN | 1156516 A | 8/1997 |
| CN | 1621549 A | 6/2005 |

(Continued)

OTHER PUBLICATIONS

Grimsditch et al., "Exchange-spring systems: Coupling of hard and soft ferromagnets as measured by magnetization and Brillouin light scattering (Invited)," Journal of Applied Physics, vol. 85, No. 8, Apr. 15, 1999, 5 pp.

Huang et al., "Synthesis and characterization of Fe16N2 in bulk form," Journal of Applied Physics, vol. 75, No. 10, May 15, 1994, 3 pp.

Tsubakino et al., "Formation of Fe16N2 in iron sheet by an ion implantation method," Materials Chemistry and Physics 54, Elsevier, Jul. 1998, pp. 301-304.

Tsubakino et al., "High resolution transmission electron microscopic study of the formation of Fe16N2 in bulk iron by ion implantation," Material Letters 26, Elsevier, Feb. 1996, pp. 155-159.

(Continued)

*Primary Examiner* — Christopher S Kessler
(74) *Attorney, Agent, or Firm* — Baker & Hostetler LLP

(57) ABSTRACT

A permanent magnet may include a $Fe_{16}N_2$ phase constitution. In some examples, the permanent magnet may be formed by a technique that includes straining an iron wire or sheet comprising at least one iron crystal in a direction substantially parallel to a <001> crystal axis of the iron crystal; nitridizing the iron wire or sheet to form a nitridized iron wire or sheet; annealing the nitridized iron wire or sheet to form a $Fe_{16}N_2$ phase constitution in at least a portion of the nitridized iron wire or sheet; and pressing the nitridized iron wires and sheets to form bulk permanent magnet.

13 Claims, 10 Drawing Sheets

(56) References Cited

U.S. PATENT DOCUMENTS

| | | |
|---|---|---|
| 2012/0153212 A1 | 6/2012 | Liu |
| 2013/0126775 A1 | 5/2013 | Abe et al. |
| 2013/0140076 A1 | 6/2013 | Lee et al. |
| 2014/0001398 A1 | 1/2014 | Takahaski et al. |
| 2014/0008446 A1 | 1/2014 | Carr |
| 2014/0290434 A1 | 10/2014 | Matthiesen |
| 2014/0299810 A1 | 10/2014 | Wang et al. |
| 2015/0380135 A1 | 12/2015 | Wang et al. |
| 2015/0380158 A1 | 12/2015 | Brady et al. |
| 2016/0042846 A1 | 2/2016 | Wang et al. |
| 2016/0042849 A1 | 2/2016 | Wang et al. |
| 2016/0141082 A1 | 5/2016 | Wang et al. |
| 2016/0189836 A1 | 6/2016 | Takahaski et al. |

FOREIGN PATENT DOCUMENTS

| | | |
|---|---|---|
| CN | 102576591 A | 7/2012 |
| CN | 103339694 A | 10/2013 |
| CN | 103827986 A | 5/2014 |
| CN | 105849834 A | 6/2014 |
| EP | 0509361 A2 | 10/1992 |
| EP | 0633581 A1 | 1/1995 |
| EP | 0994493 A2 | 4/2000 |
| EP | 1548760 A2 | 6/2005 |
| EP | 1675133 A2 | 6/2006 |
| EP | 2492927 A1 | 8/2012 |
| EP | 2666563 A1 | 11/2013 |
| EP | 2696356 A1 | 2/2014 |
| JP | S61143557 A | 7/1986 |
| JP | S61157634 A | 7/1986 |
| JP | S62232101 A | 10/1987 |
| JP | 62-297437 A | 12/1987 |
| JP | S63132701 A | 6/1988 |
| JP | 01-261803 A | 10/1989 |
| JP | H02173209 A | 7/1990 |
| JP | 2212320 A | 8/1990 |
| JP | H02212320 A | 8/1990 |
| JP | H03100124 A | 4/1991 |
| JP | H04217305 A | 8/1992 |
| JP | H05269503 A | 10/1993 |
| JP | 5311390 A | 11/1993 |
| JP | H05311390 A | 11/1993 |
| JP | H05326239 A | 12/1993 |
| JP | 6096947 A | 4/1994 |
| JP | H0696947 A | 4/1994 |
| JP | 6267722 A | 9/1994 |
| JP | H06267722 A | 9/1994 |
| JP | H06311390 A | 11/1994 |
| JP | 11-026272 A | 1/1999 |
| JP | 2000176513 A | 6/2000 |
| JP | 2001135508 A | 5/2001 |
| JP | 2001176715 A | 6/2001 |
| JP | 2002334695 A | 11/2002 |
| JP | 2004319923 A | 11/2004 |
| JP | 2005183932 A | 7/2005 |
| JP | 2007070669 A | 3/2007 |
| JP | 2007273038 A | 10/2007 |
| JP | 2008311518 A | 12/2008 |
| JP | 2009259402 A | 11/2009 |
| JP | 2012246174 A | 12/2012 |
| JP | 2013069926 A | 4/2013 |
| JP | 2013080922 A | 5/2013 |
| KR | 1020120091091 A | 8/2012 |
| TW | 272293 B | 3/1996 |
| TW | I303072 B | 11/2008 |
| TW | 201249564 A | 12/2012 |
| TW | 201447934 A | 12/2014 |
| WO | WO 2011049080 A1 | 4/2011 |
| WO | WO 2012159096 A2 | 11/2012 |
| WO | 2013026007 A2 | 2/2013 |
| WO | 2013042721 A1 | 3/2013 |
| WO | 2013090895 A1 | 6/2013 |
| WO | WO 2014124135 A2 | 8/2014 |
| WO | 2014210027 A1 | 12/2014 |
| WO | WO 2014210027 A1 | 12/2014 |
| WO | 2015148810 A1 | 10/2015 |
| WO | 2016022685 A1 | 2/2016 |
| WO | 2016022711 A1 | 2/2016 |
| WO | 2016122971 A1 | 8/2016 |
| WO | 2016122987 A1 | 8/2016 |
| WO | 2016122712 A1 | 8/2017 |

OTHER PUBLICATIONS

Slater, "Electronic Structure of Alloys," Journal of Applied Physics, vol. 8, No. 6, Jun. 1937, 8 pp.

Kikkawa et al., "Fine Fe16N2 powder prepared by low-temperature nitridation," Materials Research Bulletin, vol. 42, ScienceDirect, Feb. 19, 2008, 8 pp.

Zayak et al., "First-principles investigations of homogenous lattice-distortive strain and shuffles in Ni2MnGA," Journal of Physics: Condensed Matter, vol. 15, No. 2, Jan. 22, 2003, 8 pp.

Bogaerts et al., "Monte Carlo simulation of an analytical glow discharge: motion of electrons, ions and fast neutrals in the cathode dark space," Spectrochimica Acta, vol. 50B, No. 2, Jan. 1995, 20 pp.

Gagnoud et al., "Electromagnetic Modelling of Induction Melting Devices in Cold Crucible," IEEE Transactions on Magnetics, vol. 24, No. 1, Jan. 1988, 5 pp.

Sakuma, "Electronic and Magnetic Structure of Iron Nitride, Fe1SN2 (invited)," Journal of Applied Physics, vol. 79, No. 8, Apr. 15, 1996, 8 pp.

Resta, "Topical Review: Why are Insulators Insulating and Metals Conducting?," Journal of Physics: Condensed Matter, vol. 14, No. 20, May 27, 2002, 14 pp.

Becke, "Density-Functional Exchange-Energy Approximation With Correct Asymptotic Behavior," Physical Review A General Physics, vol. 38, No. 6, Sep. 15, 1998, 4 pp.

Floris et al., "Vibrational Properties of MnO and NiO from DFT + U-Based Density Functional Perturbation Theory," Physical Review B Condensed Matter, vol. 84, Oct. 13, 2011, 6 pp.

Liechtenstein et al., "Density-Functional Theory and Strong Interactions: Orbital Ordering in Mott-Hubbard Insulators," Physical Review B Condensed Matter, vol. 52, No. 8, Aug. 15, 1995, 5 pp.

Vasil'Ev et al., "Structural and Magnetic Phase Transitions in Shape-Memory Alloys Ni2+xMn1_xGa," Physical Review B, vol. 59. No. 2, Jan. 1, 1999, pp. 1113-1120.

Sozinov et al., "Crystal Structures and Magnetic Anisotropy Properties of Ni—Mn—Ga Martensitic Phases With Giant Magnetic-Field-Induced Strain," IEEE Transactions on Magnetics, vol. 38, No. 5, Sep. 2002, pp. 2814-2816.

Zayak et al., "Switchable Ni—Mn—Ga Heusler nanocrystals," Journal of Applied Physics vol. 104, No. 7, Oct. 2008, 6 pp.

Likhachev et al., "Modeling the Strain Response, Magneto-Mechanical Cycling Under the External Stress, Work Output and Energy Losses in Ni—Mn—Ga," Mechanics of Materials, vol. 38, May 2006 pp. 551-563.

Morisako et al., "Magnetic Anisotropy and Soft Magnetism of Iron Nitride Thin Films Prepared by Facing-Target Sputtering," Journal of Applied Physics, vol. 69, No. 8, Apr. 15, 1991, pp. 5619-5621.

Jordan et al., "Magnetic Fluid Hyperthermia (MFH): Cancer Treatmetn with AC Magnetic Field Induced Excitation of Biocompatible Superparamagnetic Nanoparticles," Journal of Magnetism and Magnetic Materials vol. 201, Jul. 1, 1999 pp. 413-419.

Chakrabarti et al., "Influence of Ni Doping on the Electronic Structure of Ni2MnGa," Physical Review B vol. 72, Aug. 5, 2005, 4 pp.

Kirby et al., "Anomalous ferromagnetism in TbMn03 thin films," Journal of Applied Physics, vol. 105, No. 7, Apr. 2009, 3 pp.

"2014 Titans of Technology—Jian-Ping Wang," Minneapolis/St. Paul Business Journal, Sep. 19, 2014, 18 pp.

Brady et al., "The Formation of Protective Nitride Surfaces for PEM Fuel Cell Metallic Bipolar Plates," Journal of the Minerals, Aug. 2006, pp. 51-57.

Himmetoglu, et al., "First-Principles Study of Electronic and Structural Properties of CuO," Physical Review B. vol. 84, Sep. 14, 2011, 8 pp.

(56) References Cited

OTHER PUBLICATIONS

Wedel et al., "Low Temperature Crystal Structure of Ni—Mn—Ga Alloys," Journal of Alloys and Compounds, vol. 290, Aug. 30, 1999 pp. 138-143.

Min, "Enhancement of Fe Magnetic Moments in Ferromagnetic Fe16Bz, Fe16Cz, and Fe16Nz," International Journal of Modern Physics B. vol. 7, No. 1-3, Jan. 1993, pp. 729-732.

Bozorth, "Atomic Moments of Ferromagnetic Alloys," The Physical Review, vol. 79, No. 5, Sep. 1, 1950. pp. 887.

Rong et al., "Fabrication of Bulk Nanocomposite Magnets via Severe Plastic Deformation and Warm Compaction," Applied Physics Letters, vol. 96, No. 10, Mar. 8, 2010, 3 pp.

Lorenz et al., "Precise Determination of the Bond Percolation Thresholds and Finite-Size Scaling Corrections for the sc, fcc, and bcc Lattices," Physical Review E, vol. 57, No. 1, Jan. 1998, pp. 230-236.

Majkrzak, "Polarized Neutron Reflectometry," Physica B, vol. 173, No. 1 & 2, Aug. 1991, 16 pp.

Opeil et al., "Combined Experimental and Theoretical Investigation of the Premartensitic Transition in Ni2MnGa," Physical Review Letters, vol. 100, Apr. 25, 2008, 4 pp.

Gao et al., "Quantitative Correlation of Phase Structure With the Magnetic Moment in rf Sputtered Fe—N Films," Journal of Applied Physics, vol. 73, No. 10, May 15, 1993, pp. 6579-6581.

Ortiz et al., "Epitaxial Fe16N2 Films Grown by Sputtering," Applied Physics Letters, vol. 65. No. 21, Nov. 21, 1994, pp. 2737-2739.

Cheng et al., "Tempering of Iron-Carbon-Nitrogen Martensites," Metallurgical Transactions, vol. 23A, No. 4, Apr. 1992, pp. 1129-1145.

Chikazumi, "Physics of Ferromagnetism," Oxford Science Publications, Ed. 2, 1999, pp. 199-203. (Applicant points out, in accordance with MPEP 609.04(a), that the year of publication, 1999, is sufficiently earlier than the effective U.S. filing date, Aug. 17, 2011, so that the particular month of publication is not in issue.).

Wehrenberg et al., "Shock Compression Response of tα"—Fe16N2 Nanoparticles," Journal of Applied Physics, vol. 111, No. 8, Apr. 23, 2012, 6 pp.

Ceperley et al., "Ground State of the Electron Gas by a Stochastic Method," Physical Review Letters, vol. 45, No. 7, Aug. 18, 1980, pp. 566-569.

Borsa et al., "Phase Identification of Iron Nitrides and Iron Oxy-Nitrides with Mossbauer Spectroscopy," Nuclear Solid State Physics, Dec. 2003, pp. 31-48.

Cook, "Strain Induced Martensite Formation in Stainless Steel," Metallurgical Transactions, vol. 18A, No. 2, Feb. 1987, pp. 201-210.

Sun et al., "Epitaxial Single Crystal Fe16N2 Films Grown by Facing Targets Sputtering," Journal of Applied Physics, vol. 79, No. 8, Apr. 15, 1996, pp. 5440-5442.

Ping et al., "Partitioning of Ga and Co Atoms in a Fe3B/Nd2Fe14B Nanocomposite Magnet," Journal of Applied Physics, vol. 83, No. 12, Jun. 15, 1998, pp. 7769-7775.

Scherlis et al., "Simulation of Heme Using DFT + U: A Step Toward Accurate Spin-State Energetics," The Journal of Physical Chemistry, vol. 111, Apr. 21, 2007, pp. 7384-7391.

Jugovic et al., "A Review of Recent Developments in the Synthesis Procedures of Lithium Iron Phosphate Powders," Journal of Power Sources, vol. 190, Feb. 6, 2009, pp. 538-544.

Fullerton et al., "Structure and Magnetic Properties of Exchange-Spring Sm—Co/Co Superlattices," Applied Physics Letters vol. 72, No. 3, Jan. 19, 1998, pp. 380-382.

Van Voorthuysen et al., "Low-Temperature Extension of the Lehrer Diagram and the Iron-Nitrogen Phase Diagram," Metallurgical and Materials Transactions A, vol. 33A, No. 8, Aug. 2002, pp. 2593-2598.

Kita et al., "Magnetic Properties of Core-Shell Type Fe16N2 Nanoparticles," Journal of Magnetism and Magnetic Materials, vol. 310, Nov. 21, 2006, pp. 2411-2413.

Kneller et al., "The Exchange-Spring Magnet: A New Material Principle for Permanent Magnets," IEEE Transaction on Magnetics, vol. 27, No. 4, Jul. 1991, pp. 3588-3600.

Lavernia et al., "The Raid Solidification Processing of Materials: Science, Principles, Technology, Advances, and Applications," Journal of Material Science, vol. 45, Dec. 1, 2009, pp. 287-325.

Casoli et al., "Exchange-Coupled FePt/Fe Bilayers with Perpendicular Magnetization," IEEE Transactions on Magnetics, vol. 41, No. 10, Oct. 2005, pp. 3877-3879.

Zhou et al., "Phase Separation in LixFePO4 Induced by Correlation Effects," Physical Review B, vol. 69, May 12, 2004, 4 pp.

Zhou et al., "First-Principles Prediction of Redox Potentials in Transition-Metal Compounds with LDA+U," Physical Review B. vol. 70, Dec. 20, 2004, 8 pp.

Zhou et al., "The Li Intercalation Potential of LiMPO4 and LiMSiO4 Olivines with M=Fe, Mn, Co, Ni," Electrochemistry Communications, vol. 6, Sep. 25, 2004, pp. 1144-1148.

Zhou et al., "Configurational Electronic Entropy and the Phase Diagram of Mixed-Valence Oxides: the Case of LixFePO4," Physical Review Letters, vol. 97, Oct. 13, 2006, 4 pp.

Herzer, "Grain Size Dependence of Coercivity and Permeability in Nanocrystalline Ferromagnets," IEEE Transactions on Magnetics, vol. 26, No. 5, Sep. 1990, pp. 1397-1402.

Ludtka et al., "In Situ Evidence of Enhanced Transformation Kinetics in a Medium Carbon Steel Due to a High Magnetic Field," Scripta Materialia, vol. 51, Apr. 20, 2004, pp. 171-174.

Felcher, "Neutron Reflection as a Probe of Surface Magnetism," Physical Review B, vol. 24, No. 3, Aug. 1, 1981, pp. 1595-1598.

Speich et al., "Elastic Constants of Binary Iron-Base Alloys," Metallurgical Transactions, vol. 3, No. 8, Aug. 1972, pp. 2301-2037.

Fernando et al., "Magnetic Moment of Iron in Metallic Environments," Physical Review B, vol. 61, No. 1, Jan. 1, 2000, pp. 375-381.

Felcher, "Magnetic Depth Profiling Studies by Polarized Neutron Reflection," Physica B, vol. 192, Nos. 1 & 2, Jan. 1993, pp. 137-149.

Gaunt, "The Magnetic Properties of Platinum Cobalt Near the Equiatomic Composition Part II. Mechanism of Magnetic Hardening," The Philosophical Magazine, vol. 13, No. 123, Mar. 1966, pp, 579-588.

Takahashi et al., "α"—Fe16N2 Problem—Giant Magnetic Moment or Not," Journal of Magnetism and Magnetic Materials, vol. 208, No. 3, Jan. 11, 2000, pp. 145-157.

Shokrollahi et al., "Soft Magnetic Composite Materials (SMCs)," Journal of Materials Processing Technology, vol. 189, Feb. 20, 2007, pp. 1-12.

Sugita et al., "Magnetic and Electrical Properties of Single-Phase, Single-Crystal Fe16N2 Films Epitaxially Grown by Molecular Beam Epitazy (Invited)," Journal of Applied Physics, vol. 79, No. 8, Apr. 15, 1996, pp. 5576-5581.

Takahashi et al., "Perpendicular Uniaxial Magnetic Anisotropy of Fe16N2(001) Single Crystal Films Grown by Molecular Beam Epitaxy," IEEE Transactions on Magnetics, vol. 25, No. 5, Sep. 1999, pp. 2982-2984.

Tanaka et al., "Electronic Band Structure and Magnetism of Fe16N2 Calculated by the Flapw Method," Physical Review B, vol. 62, No. 22, Dec. 1, 2000, pp. 15042-15046.

Zeng et al., "Exchange-Coupled Nanocomposite Magnets by Nanoparticle Self-Assembly," International Weekly Journal of Science: Nature, vol. 420, No. 6914, Nov. 28, 2002, pp. 395-398.

Du, "A Reevaluation of the Fe—N and Fe—C—N Systems," Nournal of Phase Equilibria, vol. 14, No. 6, Aug. 24, 1993, pp. 682-693.

Jiang et al., "The Thermostability of the Fe16N2 Phase Deposited on a GaAs Substrate by Ion-Bean-Assisted Deposition," Journal of Physical Condensed Matter, vol. 6, Mar. 17, 1994, pp. L279-L282.

Jan et al., "Monte Carlo Simulations of Spin-1/2 Micelle and Microemulsion Models," Journal De Physique, vol. 49, No. 4, Apr. 1988, pp. 623-633.

Nelson, "Epitaxial Growth From the Liquid State and Its Application to the Fabrication of Tunnel and Laser Diodes," RCA Review, vol. 24, No. 4, Dec. 1963, pp. 603-615.

(56) References Cited

OTHER PUBLICATIONS

Shinno et al., "Effects of Film Thickness on Formation Processes of Fe16N2 in Nitrogen Ion-Implanted Fe Films," Surface and Coatings Technology vol. 103-104, May 1998, pp. 129-134.
Takahashi et al., "Ferromagnetic Resonance Studies of Fe16N2 Films with a Giant Magnetic Moment," Journal of Applied Physics, vol. 73, No. 10, May 15, 1993, pp. 6060-6062.
Shimba et al., "Preparation of Iron Nitride Fe16N2 Nanoparticles by Reduction of Iron Nitrate," J. Japan Inst. Metals, vol. 74, No. 3, 2010, 5 pp. (Applicant points out, in accordance with MPEP 609.04(a), that the year of publication, 2010, is sufficiently earlier than the effective U.S. filing date, Aug. 17, 2011, so that the particular month of publication is not in issue.).
Hook et al., "Magnetic Order," Solid State Physics, Ed. 2, Ch. 8, 1991, pp. 219-252. (Applicant points out, in accordance with MPEP 609.04(a), that the year of publication, 1991, is sufficiently earlier than the effective U.S. filing date, Aug. 17, 2011, so that the particular month of publication is not in issue.).
Hsu et al., "First-Principles Study for Low-Spin LaCoO3 with a Structurally Consistent Hubbard U," Physical Review B, vol. 79, Mar. 31, 2009, 9 pp.
Hsu et al., "Spin-State Crossover and Hyperfine Interactions of Ferric Iron in MgSiO3 Perovskite," Physical Review Letters, vol. 106, Mar. 18, 2011, 4 pp.
McCurrie, "Chapter 3: The Structure and Properties of Alinco Permanent Magnet Alloys," Handbook of Ferromagnetic Materials, vol. 3, 1982, 82 pp. (Applicant points out, in accordance with MPEP 609.04(a), that the year of publication, 1982, is sufficiently earlier than the effective U.S. filing date, Aug. 17, 2011, so that the particular month of publication is not in issue.).
Kulik et al., "Density Functional Theory in Transition-Metal Chemistry: a Self-Consistent Hubbard U Approach," Physical Review Letters, vol. 97, Sep. 8, 2006, 4 pp.
Bae et al., "Cost Effective Parallel-Branch Spiral Inductor with Enhanced Quality Factor and Resonance Frequency," Electronics and Telecommunications Research Institute, 2007, pp. 87-90. (Applicant points out, in accordance with MPEP 609.04(a), that the year of publication, 2007, is sufficiently earlier than the effective U.S. filing date, Aug. 17, 2011, so that the particular month of publication is not in issue.).
Galanakis et al., "Spin-Polarization and Electronic Properties of Half-Metallic Heusler Alloys Calculated from First Principles," Journal of Physics: Condensed Matter, vol. 19, No. 31, Aug. 8, 2007, 16 pp.
Al-Omari et al., "Magnetic Properties of Nanostructured CoSm/FeCo Films," Physical Review B, vol. 52, No. 5, Aug. 1, 1995, pp. 3441-3447.
Mazin et al., "Insulating Gap in FeO: Correlations and Covalency," Physical Review B, vol. 55, No. 19, May 15, 1997, pp. 12822-12825.
Solovyev et al., "Corrected Atomic Limit in the Local-Density Approximation and the Electronic Structure of d Impurities in Rb," Physical Review B, vol. 50, No. 23, Dec. 15, 1994, pp. 16861-16871.
Campos et al., "Evaluation of the Diffusion Coefficient of Nitrogen in Fe4N1-x Nitride Layers During Microwave Post-Discharge Nitriding," Applied Surface Science, vol. 249, Dec. 30, 2004, pp. 54-59.
Issakov et al., "Fast Analytical Parameters Fitting of Planar Spiral Inductors," 2008 IEEE International Conference on Microwaves, Communications, Antennas and Electronic Systems, May 13-14, 2008, 10 pp.
Borchers et al., "Observation of Antiparallel Magnetic Order in Weakly Coupled Co/Cu Multilayers," Physical Review Letters, vol. 82, No. 13, Mar. 29, 1999, pp. 2796-2799.
Takahashi et al., "Structure and Magnetic Moment of α"-Fe 16N2 Compound Films: Effect of Co and H on Phase Formation (Invited)," Journal of Applied Physics, vol. 79, No. 8, Apr. 15, 1996, pp. 5564-5569.
Buschbeck et al., "Full Tunability of Strain Along the fcc-bcc Bain Path in Epitaxial Films and Consequences for Magnetic Properties," Physical Review Letters, vol. 103, Nov. 20, 2009, 4 pp.
Chakhalian et al., "Magnetism at the Interface Between Ferromagnetic and Superconducting Oxides," Nature Physics, vol. 2, Apr. 1, 2006, pp. 244-248.
Cui et al., "Phase Transformation and Magnetic Anisotropy of an Iron-Palladium Ferromagnetic Shape-Memory Alloy," Acta Materialia, vol. 52, No. 1, Jan. 5, 2004, 35-47.
Davies et al., "Anisotropy Dependence of Irreversible Switching in Fe/SmCo and FeNi/FePt Exchange Spring Magnet Films," Applied Physics Letters, vol. 86, Jun. 27, 2005, 3 pp.
Herbst et al., "Neodymium-Iron-Boron Permanent Magnets," Journal of Magnetism and Magnetic Materials, vol. 100, Nos. 1-3, Nov. 1991, pp. 57-78.
Fidler et al., "Recent Developments in Hard Magnetic Bulk Materials," Journal of Physics: Condensed Matter, vol. 16, Jan. 23, 2004, pp. 455-470.
Haenl et al., "Room-Temperature Ferroelectricity in Strain SrTiO3," Letters to Nature, vol. 430, Aug. 12, 2004, pp. 758-761.
Hoppler et al., "Giant Superconductivity-Induced Modulation of the Ferromagnetic Magnetization in a Cuprate-Manganite Superlattice," Nature Materials, vol. 8, Apr. 2009, pp. 315-319.
Coey, "The Magnetization of Bulk α"Fe16N2 (Invited)," Journal of Applied Physics, vol. 76, Nov. 15, 1994, pp. 6632-6636.
Coey et al., "The Magnetization of α"Fe16N2," Journal of Physics: Condensed Matter, vol. 6, Sep. 27, 1993, pp. 23-28.
Coey, "Magic Moments in Magnetism," Physics World, vol. 6, No. 8, Aug. 1993, pp. 25-26.
Qiu et al., "Tuning the Crystal Structure and Magnetic Properties of FePt Nanomagnets," Advanced Materials, vol. 19, Jun. 6, 2007, pp. 1703-1706.
Wang, "FePt Magnetic Nanoparticles and Their Assembly for Future Magnetic Media," Proceedings of the IEEE, vol. 96, No. 11, Nov. 2008, pp. 1847-1863.
Qiu et al., "Monodispersed and Highly Ordered L10 FePt Nanoparticles Prepared in the Gas Phase," Applied Physics Letters, vol. 88, May 9, 2006, 3 pp.
Qiu et al., "In Situ Magnetic Field Alignment of Directly Ordered L10 FePt Nanoparticles," Applied Physics Letters, vol. 89, Nov. 29, 2006, 3 pp.
Liu et al., "High Energy Products in Rapidly Annealed Nanoscale Fe/Pt Multilayers," Applied Physics Letters, vol. 72, No. 4, Jan. 26, 1998, pp. 483-485.
Coey et al., "Magnetic nitrides," Journal of Magnetism and Magnetic Materials, vol. 200, Mar. 10, 1999, 20 pp.
Shi et al., "Diamond-Like Carbon Films Prepared by Facing-Target Sputtering," Thin Solid Films, vols. 420-421, Dec. 2, 2002, pp. 172-175.
Jiang et al., "Improving Exchange-Spring Nanocomposite Permanent Magnets," Applied Physics Letters, vol. 85, No. 22, Nov. 29, 2004, pp. 5293-5295.
Zhou et al., "Permanent-Magnet Properties of Thermally Processed FePt and FePt—Fe Multilayer Films," IEEE Transactions on Magnetics, vol. 38, No. 5, Sep. 2002, pp. 2802-2804.
MacLaren, "Role of Alloying on the Shape Memory Effect in Ni2MnGa," Journal of Applied Physics, vol. 91, No. 10, May 15, 2002, pp. 7801-7803.
Perdew et al., "Self-Interaction Correction to Density-Functional Approximations for Many-Electron Systems," Physical Review B, vol. 23, No. 10, May 15, 1981, pp. 5048-5079.
Dong et al., "Shape Memory and Ferromagnetic Shape Memory Effects in Single-Crystal Ni2MnGa Thin Films," Journal of Applied Physics, vol. 95, No. 5, Mar. 1, 2004, pp. 2593-2600.
Bland et al., "Ferromagnetic Moments in Metastable Magnetic Films by Spin-Polarized-Neutron Reflection," Physical Review Letters, vol. 58, No. 12, Mar. 23, 1987, pp. 1244-1247.
Bland et al., "Layer Selective Magnetometry in Ultrathin Magnetic Structures by Polarised Neutron Reflection," Journal of Magnetism and Magnetic Materials, vol. 165, Jun. 1997, pp. 46-51.
Ji et al., "Elemental Specific Study on FeCo—Au nanoparticles," Bulletin of the American Physical Society, APS Meeting 2010, vol. 55, No. 2, Mar. 15-19, 2010, 1 pp.

(56) References Cited

OTHER PUBLICATIONS

Coey, "Permanent Magnet Applications Journal of Magnetism and Magnetic Materials," vol. 248, Apr. 24, 2002, pp. 441-456.
Inoue et al., "Enhancement of the Formation of Fe15N2 on Fe Films by Co Additions (Invited)," Journal of Applied Physics, vol. 76, No. 10, Nov. 15, 1994, pp. 6653-6655.
Zhang et al., "Polarizer angular dependence of spin transfer oscillation in magnetic tunnel junction," Bulletin of the American Physical Society, APS Meeting 2010, vol. 55, No. 2, Mar. 15-19, 2010, 1 pp.
Tang et al., "Formation of Nanocrystalline Fe—N—B—Cu Soft Magnetic Ribbons," Journal of Non-Crystalline Solids, vol. 337, Sep. 9, 2003, pp. 276-279.
Chen et al., "Modeling of On-Chip Differential Inductors and Transformers/Baluns," IEEE Transactions on Electron Devices, vol. 54, No. 2, Feb. 2007, pp. 369-371.
Ji et al., "n. Site Ordering Effect on Partially Ordered Fe16N2," Applied Physics Letters, vol. 98, No. 9, Feb. 28, 2011, 3 pp.
Ji et al., "Epitaxial High Saturation Magnetization FeN Thin Films on Fe(001) Seeded GaAs(001) Single Crystal Wafer Using Facing Target Sputterings," Journal of Applied Physics, vol. 109, No. 7, Apr. 2011, 6 pp.
"Nanocrystalline soft magnetic material, FINEMET," Materials Magic, Hiatchi Metals, Apr. 2005, 12 pp.
Tomioka et al., "Iron Nitride Powder Produced as Substitute for Rare Metal," Nikkei Technology, Mar. 7, 2011, 2 pp.
Ji et al., "Perpendicular Magnetic Anisotropy and High Spin-Polarization Ratio in Epitaxial Fe—N Thin Films," Physical Review B, vol. 84, Dec. 14, 2011, 8 pp.
Zheng et al., "Iron Nitride Thin Films Deposited by Chloride Assisted Plasma Enhanced Chemical Vapour Deposition: Facile Stoichiometry Control and Mechanism Study," Journal of Applied Physics D: Applied Physics, vol. 42, No. 18, Sep. 21, 2009, 9 pp.
Jiang et al., "FeN Foils by Nitrogen Ion-Implantation," Journal of Applied Physics, vol. 115, Mar. 12, 2014, 3 pp.
Jiang et al., "9 T High Magnetic Field Annealing Effects on FeN Bulk Sample," Journal of Applied Physics, vol. 115, Mar. 13, 2014, 3 pp.
Yao et al., "Formation and Magnetic Properties of Fe16N2 Films Prepared by Ion-Beam-Assisted Deposition," Journal of Magnetism and Magnetic Materials, vol. 177-181, Jan. 1998, pp. 1291-1292.
Croat, "Current Status of Rapidly Solidified Nd—Fe—B Permanent Magnets," IEEE Transactions on Magnetics, vol. 25, No. 5, Sep. 1989, pp. 3550-3554.
Perdew et al., "Generalized Gradient Approximation Made Simple," Physical Review Letters, vol. 77, No. 18, Oct. 28, 1996, pp. 3865-3868.
Guo et al., "A Broadband and Scalable Model for On-Chip Inductors Incorporating Substrate and Conductor Loss Effects," IEEE Radio Frequency Integrated Circuits Symposium, Jun. 12-14, 2005, pp. 593-596.
Jack, "The Occurrence and the Crystal Structure of α"—Iron Nitride; A New Type of Interstitial Alloy Formed During the Tempering of Nitrogen-Martensite," Proceedings of the Royal Society of London, vol. 28, Sep. 24, 1951, pp. 216-224.
Jack, "The Iron-Nitrogen System: The Preparation and the Crystal Structures of Nitrogen-Austenite (γ) and Nitrogen-Martensite (α')*," Proceedings of the Royal Society of London, Mar. 13, 1951, pp. 200-217.
Yamanaka et al., "Humidity Effects in Fe16N2 Fine Powder Preparation by Low-Temperature Nitridation," Journal of Solid State Chemistry, vol. 183, Aug. 4, 2010, pp. 2236-2241.
Frisk, "A New Assessment of the Fe—N Phase Diagram" Calphad, vol. 11, No. 2, 1987, pp. 127-134. (Applicant points out, in accordance with MPEP 609.04(a), that the year of publication, 1987, is sufficiently earlier than the effective U.S. filing date, Aug. 17, 2011, so that the particular month of publication is not in issue.).
Nakajima et al., "Large Magnetization Induced in Single Crystalline Iron Films by High-Dose Nitrogen Implantation," Applied Physics Letters, vol. 56, No. 1, Jan. 1, 1990, pp. 92-94.
Nakajima et al., "Nitrogen-Implantation-Induced Transformation of Iron to Crystalline Fe16N2 in Epitaxial Iron Films," Applied Physics Letters, vol. 54, No. 25, Jun. 19, 1989, pp. 2536-2538.
Nakajima et al., "Formation of Ferromagnetic Iron Nitrides in Iron Thin Films by High-Dose Nitrogen Ion Implantation," Journal of Applied Physics, vol. 65, No. 11, Jun. 1, 1989, pp. 4357-4361.
Kaneko et al., "Fe—Cr—Co Ductile Magnet With (BH)max = 8 MGOe," AIP Conference Proceedings, 1976, 2 pp. (Applicant points out, in accordance with MPEP 609.04(a), that the year of publication, 1976, is sufficiently earlier than the effective U.S. filing date, Aug. 17, 2011, so that the particular month of publication is not in issue.).
Strnat, "Modern Permanent Magnets for Applications in Electro-Technology," Proceedings of the IEEE, vol. 78, No. 6, Jun. 1990, pp. 923-946.
Strnat et al., "Bonded Rare Earth-Cobalt Permanent Magnets," Proceedings of the 12$^{th}$ Rare Earth Research Conference, vol. 1, Jul. 18-22, 1976, 11 pp.
Strnat et al., "Rare Earth—Cobalt Permanent Magnets," Journal of Magnetism and Magnetic Materials, vol. 100, Nos. 1-3, Nov. 1991, pp. 38-56.
Yang et al., "The Effect of Strain Induced by Ag Underlayer on Saturation Magnetization of Partially Ordered Fe16N2 Thin Films," Applied Physics Letters, vol. 103, Dec. 12, 2013, 4 pp.
Lewis et al., "Perspectives on Permanent Magnetic Materials for Energy Conversion and Power Generation," Metallurgical and Materials Transactions A, vol. 44A, Jan. 2013, 19 pp.
Pauling, "The Nature of the Interatomic Forces in Metals," Physical Review, vol. 54, Dec. 1, 1938, pp. 899-904.
Davison et al., "Shock Compression of Solids," Physics Reports, vol. 55, No. 4, Apr. 1979, pp. 255-379.
Liu et al., "Nanocomposite Exchange-Spring Magnet Synthesized by Gas Phase Method: From Isotropic to Anisotropic," Applied Physics Letters, vol. 98, Jun. 3, 2011, 3 pp.
Liu et al., "Discovery of localized states of Fe 3D electrons in Fe16N2 and Fe8N films: an evidence of the existence of giant saturation magnetization," arXiv: 0909.4478, Sep. 2009, 13 pp.
Amato et al., "Exchange-Spring Behavior of Hard/Soft Magnetic Multilayers: Optimization Study of the Nanostructure," Physica B: Condensed Matter, vol. 275, Nos. 1-3, Jan. 2000, pp. 120-123.
Tijssens et al., "Towards an Improved Continuum Theory for Phase Transformations," Materials Science and Engineering, vol. 378, Sep. 23, 2003, pp. 453-458.
Komuro et al., "Epitaxial Growth and Magnetic Properties of Fe16N2 Films with High Saturation Magnetic Flux Density (Invited)," Journal of Applied Physics, vol. 67, No. 9, May 1, 1990, pp. 5126-5130.
Brady et al., "Alloy Design of Intermetallics for Protective Scale Formation and for use as Precursors for Complex Ceramic Phase Surfaces," Intermetallics, vol. 12, Apr. 1, 2004, pp. 779-789.
Brady et al., "Pre-Oxidized and Nitrided Stainless Steel Alloy Foil for Proton Exchange Membrane Fuel Cell Bipolar Plates: Part 1. Corrosion, Interfacial Contact Resistance, and Surface Structure," Journal of Power Sources, vol. 195, Mar. 20, 2010, pp. 5610-5618.
Kronmüller et al., "Micromagnetic Analysis of the Magnetic Hardening Mechanisms in Re—Fe—B Magnets," Journal De Physique, Dec. 1988, 6 pp.
Kim et al., "New Magnetic Material Having Ultrahigh Magnetic Moment," Applied Physics Letters, vol. 20, No. 12, Jun. 15, 1972, pp. 492-494.
Ziegler, "SKIM—The Stopping and Range of Ions in Matter," retrieved from http://srim.org/ on Oct. 13, 2016, 4 pp.
Takahashi et al., "Magnetic Moment of α"—Fe16N2 Films (Invited)," Journal of Applied Physics, vol. 76, No. 10, Nov. 15, 1994, pp. 6642-6647.
Takahashi et al., "Structure and Magnetic Moment of Fe16N2 Sputtered Film," Journal of Magnetism and Magnetic Materials, vol. 174, Jun. 12, 1997, pp. 57-69.
Takahashi et al., "Magnetocrystalline Anisotropy for α"—Fe—C and α'—Fe—N Films," IEEE Transactions on Magnetics, vol. 37, No. 4, Jul. 2001, pp. 2179-2181.

(56) References Cited

OTHER PUBLICATIONS

Mühlethaler et al., "Improved Core-Loss Calculation for Magnetic Components Employed in Power Electronic Systems," IEEE Transactions on Power Electronics, vol. 27, No. 2, Feb. 2012, pp. 964-973.
Watanabe et al., "Perpendicular Magnetization of Epitaxial FePt(001) Thin Films with High Squareness and High Coercive Force," Japanese Journal of Applied Physics, vol. 35, No. 10A, Oct. 1, 1996, pp. 1264-1267.
Zhang et al., "Thermal Stability of Partially Ordered Fe16N2 Film on Non-Magnetic Ag Under Layer," Journal of Applied Physics, vol. 115, No. 17A, Mar. 20, 2014, 3 pp.
Uijttewaal et al., "Understanding the Phase Transitions of the Ni2MnGa Magnetic Shape Memory System from First Principles," Physical Review Letters, vol. 102, Jan. 23, 2009, 4 pp.
Pugaczowa-Michalska et al., "Electronic Structure and Magnetic Properties of Ni2MnGa1—xGex and Disordered Ni2MnSn Heusler Alloys," Acta Physica Polonica A, vol. 115, No. 1, Jan. 2009, pp. 241-243.
Brewer et al., "Magnetic and Physical Microstructure of Fe16N2 Films Grown Epitaxially on Si(001)," Journal of Applied Physics, vol. 81, No. 8, Apr. 15, 1997, pp. 4128-4130.
Abdellateef et al., "Magnetic Properties and Structure of the α"—Fe16N2 Films," Journal of Magnetism and Magnetic Materials, vol. 256, Nos. 1-3, Jan. 11, 2003, pp. 214-220.
Brewer et al., "Epitaxial Fe16N2 Films Grown on Si(001) by Reactive Sputtering," Journal of Applied Physics, vol. 79, No. 8, Apr. 15, 1996, pp. 5321-5323.
Van Genderen et al., "Atom Probe Analysis of the First Stage of Tempering of Iron-Carbon-Nitrogen Martensite," Zeitschrift Für Metallkunde, vol. 88, No. 5, May 1997, pp. 401-409.
"International Energy Outlook 2013," U.S. Energy Information Administration, Jul. 2013, 312 pp.
Huang et al., "Magnetism of α'—FeN Alloys and α"—(Fe16N2)Fe Nitrides," Journal of Magnetism and Magnetic Materials, vol. 135, Nov. 30, 1993, pp. 226-230.
Huang et al., "Spin-Density Distribution in Ferromagnetic 60"—Fe16N2," Physical Review B, vol. 51, No. 5, Feb. 1, 1995, pp. 3222-3225.
Cococcioni et al., "Linear Response Approach to the Calculation of the Effective Interaction Parameters in the LDA+U Method," Physical Review B, vol. 71, Jan. 18, 2005, 16 pp.
"Annual Energy Outlook 2015, with projects to 2040," U.S. Energy Information Administration, Apr. 2015, 154 pp.
Zhang et al., "Strain Effect of Multilayer FeN Structure on GaAs Substrate," Journal of Applied Physics, vol. 113, No. 17, Apr. 10, 2013, 3 pp.
Stern et al., "Electronic and Structural Properties of Fe3Pd—Pt Ferromagnetic Shape Memory Alloys," Journal of Applied Physics, vol. 91, No. 10, May 15, 2002, pp. 7818-7820.
Zhang et al., "Energy Barriers and Hysteresis in Martensitic Phase Transformations," Acta Materialia, vol. 57, Jul. 17, 2009, pp. 4332-4352.
Ji et al., "Direct Observation of Giant Saturation Magnetization in Fe16N2," arXiv: 1211.0553, Nov. 2012, 27 pp.
Zhuge et al., "Preparation and Property of Iron Nitrides by Ball Mill Method," Journal of Functional Materials, vol. 31, No. 5, 2000, 2 pp. (Abstract Only) (Applicant points out, in accordance with MPEP 609.04(a), that the year of publication, 2000, is sufficiently earlier than the effective U.S. filing date, Aug. 17, 2011, so that the particular month of publication is not in issue.).
Qian et al., "NiZn Ferrite Thin Films Prepared by Facing Target Sputtering," IEEE Transactions Magnetics, vol. 33, No. 5, Sep. 1997, pp. 3748-3750.
Lanska et al., "Composition and Temperature Dependence of the Crystal Structure of Ni—Mn—Ga Alloys," Journal of Applied Physics, vol. 95, No. 12, Jun. 15, 2004, pp. 8074-8078.
Takahashi et al., "Growth Mechanism of FeN Films by Means of an Atmospheric Pressure Halide Chemical Vapor Deposition," Materials Chemistry and Physics, vol. 65, Jan. 18, 2000. pp. 113-116.
Ji et al., "Growth and Depth-Dependence of Saturation Magnetization of Iron Nitride Thin Films on MgO Substrate," World Scientific, vol. 2, No. 1, Apr. 12, 2012, 4 pp.
Gutfleisch et al., "Magnetic Materials and Devices for the 21$^{st}$ Century: Stronger, Lighter, and More Energy Efficient," Advanced Materials, vol. 23, 2011, Dec. 15, 2010, pp. 821-842.
Ferguson et al., "The Tempering of Fe—C—N Martensite Scripta Metallurgica," vol. 18, No. 11, Nov. 1984, pp. 1189-1194.
Brown et al., "The Crystal Structure and Phase Transitions of the Magnetic Shape Memory Compound Ni2MnGa," Journal of Physics: Condensed Matter, vol. 14, Oct. 18, 2002, pp. 10159-10171.
Bruno, "Tight-Binding Approach to the Orbital Magnetic Moment and Magnetocrystalline Anisotropy of Transition-Metal Monolayers," Physical Review B, vol. 39, No. 1, Jan. 1, 1989, pp. 865-868.
Blöchl, "Projector Augmented-Wave Method," Physical Review B, vol. 50, No. 24, Dec. 15, 1994, pp. 17953-17979.
Entel et al., "Ab Initio Modeling of Martensitic Transformation (MT) in Magnetic Shape Memory Alloys," Journal of Magnetism and Magnetic Materials, vol. 310, Nov. 27, 2006, pp. 2761-2763.
Hohenberg et al., "Inhomogeneous Electron Gas," Physical Review, vol. 136, No. 3B, Nov. 9, 1964, pp. 864-871.
Sit et al., "Realistic Quantitative Descriptions of Electron Transfer Reactions: Diabatic Free-Energy Surfaces from First-Principles Molecular Dynamics," Physical Review Letters, vol. 97, Jul. 11, 2006, 4 pp.
Paseka et al., "Structure and Magnetic Properties of Ball-Milled Iron Nitride Powders," Journal of Alloys and Compounds, vol. 274, Mar. 10, 1998, pp. 248-253.
Giannozzi et al., "Quantum ESPRESSO: A Modular and Open-Source Software Project for Quantum Simulations of Materials," Journal of Physics: Condensed Matter, vol. 21, Sep. 1, 2009, pp. 1-19.
Tong et al., "Low Temperature Wafer Direct Bonding," Journal of Microelectromechanical Systems, vol. 3, No. 1, Mar. 1994, pp. 29-35.
Fan et al., "Ferromagnetism at the Interfaces of Antiferromagnetic FeRh Epilayers," Physical Review B, vol. 82, Nov. 12, 2010, 5 pp.
Gao et al., "Exchange-coupling interaction and effective anisotropy in nanocomposite permanent materials," Chinese Science Bulletin, vol. 47, No. 14, Jul. 2002, 4 pp.
Skomski et al., "Giant Energy Product in Nanostructured Two-Phase Magnets," Physical Review B, vol. 48, No. 21, Dec. 1, 1993, pp. 15812-15816.
Tickle et al., "Magnetic and Magnetomechanical Properties of Ni2MnGa," Journal of Magnetism and Magnetic Materials, vol. 195, Feb. 2, 1999, pp. 627-638.
Sabiryanov et al., "Electronic Structure and Magnetic Properties of Hard/Soft Multilayers," Journal of Magnetism and Magnetic Materials, vol. 177-181, Pt. 2, Jan. 1998, pp. 989-990.
Metzger et al., "Magnetism of α"—Fe16N2 (Invited)," Journal of Applied Physics, vol. 76, No. 10, Nov. 15, 1994, pp. 6626-6631.
Kardonina et al., "Transformations in the Fe—N System," Metal Science and Heat Treatment, vol. 52, Nos. 9-10, Oct. 2010, pp. 5-15.
Chu et al., "Opportunities and Challenges for a Sustainable Energy Future," Nature, vol. 488, No. 7411, Aug. 16, 2012, pp. 294-303.
Blundell et al., "Polarized Neutron Reflection as a Probe of Magnetic Films and Multilayers," Physical Review B, vol. 46, No. 6, Aug. 1, 1992, pp. 3391-3400.
Takahashi et al., "Impurity effect of carbon on structure and saturation magnetization of Fe—N films," Journal of Magnetism and Magnetic Materials, vol. 210, Sep. 1, 1999, 8 pp.
Kikkawa et al., "Particle Size Dependence in Low Temperature Nitridation Reaction for Fe16N2," Journal of Alloys and Compounds, vol. 449, Dec. 21, 2008, pp. 7-10.
Okamoto et al., "Crystal Distortion and the Magnetic Moment of Epitaxially Grown α"—Fe16N2," Journal of Magnetism and Magnetic Materials, vol. 208, Jul. 12, 1999, pp. 102-114.
Roy et al., "Depth Profile of Uncompensated Spins in an Exchange Bias System," Physical Review Letters, vol. 95, Jul. 21, 2005, 4 pp.
Uchida et al., "Magnetocrystalline Anisotropy Energies of Fe16N2 and Fe16C2," Journal of Magnetism and Magnetic Materials, vol. 310, Nov. 15, 2006, pp. 1796-1798.

(56) References Cited

OTHER PUBLICATIONS

Wang et al., "Properties of a New Soft Magnetic Material," Nature, vol. 407, Sep. 14, 2000, pp. 150-151.
Dudarev et al., "Electron-Energy-Loss Spectra and the Structural Stability of Nickel Oxide: An LSDA+U Study," Physical Review B, vol. 57, No. 3, Jan. 15, 1998, pp. 1505-1509.
Kart et al., "DFT Studies on Structure, Mechanics and Phase Behavior of Magnetic Shape Memory Alloys: Ni2MnGa," Physica Status Solidi, vol. 205, No. 5, Mar. 20, 1998, pp. 1026-1035.
Barman et al., "Structural and Electronic Properties of Ni2MnGa," Physical Review B, vol. 72, Nov. 8, 2005, 7 pp.
Atiq et al., "Preparation and the Influence of Co, Pt and Cr Additions on the Saturation Magnetization of α"—Fe16N2 Thin Films," Journal of Alloys and Compounds, vol. 479, Feb. 23, 2009, pp. 755-758.
Okamoto et al., "Characterization of Epitaxially Grown Fe—N Films by Sputter Beam Method," Journal of Applied Physics, vol. 79, No. 3, Feb. 1, 1996, pp. 1678-1683.
Sugita et al., "Magnetic and Mossbauer Studies of Single-Crystal Fe16N2 and Fe—N Martensite Films Epitaxially Grown by Molecular Beam Epitaxy (Invited)," Journal of Applied Physics, vol. 76, No. 10, Nov. 15, 1994, pp. 6637-6641.
Sugita et al., "Giant Magnetic Moment and Other Magnetic Properties of Epitaxially Grown Fe16N2 Single-Crystal Films (Invited)," Journal of Applied Physics, vol. 70, No. 10, Nov. 15, 1991, pp. 5977-5982.
Toops et al., "Pre-Oxidized and Nitrided Stainless Steel Alloy Foil for Proton Exchange Membrane Fuel Cell Bipolar Plates. Part 2: Single-Cell Fuel Evaluation of Stamped Plates," Journal of Power Sources, vol. 195, Mar. 19, 2010, pp. 5619-5627.
Klemmer et al., "Magnetic Hardening and Coercivity Mechanisms in L1 Ordered FePd Ferromagnets," Scripta Metallurgica et Materialia, vol. 33, Nos. 10-11, Apr. 27, 1995, pp. 1793-1805.
Ohtani et al., "Magnetic Properties of Mn—Al—C Permanent Magnet Alloys," IEEE Transactions on Magnetics vol. MAG-13, No. 5, Sep. 1977, pp. 1328-1330.
Osaka et al., "A Soft Magnetic CoNiFe Film With High Saturation Magnetic Flux Density and Low Coercivity," Nature, vol. 392, Apr. 23, 1998, pp. 796-798.
Schrefl et al., "Exchange Hardening in Nano-Structured Two-Phase Permanent Magnets," Journal of Magnetism and Magnetic Materials, vol. 127, Jul. 12, 1993, pp. 273-277.
Kakeshita et al., "Effect of Magnetic Fields on Athermal and Isothermal Martensitic Transformations in Fe—Ni—Mn Alloys," Materials Transactions, vol. 34, No. 5, Dec. 9, 1992, pp. 415-422.
Koyano et al., "Magnetization Iron Nitride Produced Through the fcc→bct Martensitic Transformation in High Magnetic Field," Journal of Applied Physics, vol. 100, Aug. 9, 2006, 5 pp.
Oku et al., "Small-Angle Polarized Neutron Scattering Study of Spherical Fe16N2 Nano-Particles for Magnetic Recording Tape," Physica B, vol. 404, Sep. 1, 2009, pp. 2575-2577.
Shimoda et al., "High-Energy Cast Pr—Fe—B Magnets," Journal of Applied Physics, vol. 64, No. 10, Nov. 15, 1988, pp. 5290-5292.
Weber et al., "Search for Giant Magnetic Moments in Ion-Beam-Synthesized α"—Fe16N2," Thin Solid Films, vol. 279, Jun. 1996, pp. 216-220.
Watanabe et al., "A New Challenge: Grain Boundary Engineering for Advanced Materials by Magnetic Field Application," Journals of Materials Science, vol. 41, No. 23, Dec. 2006, pp. 7748-7759.
Takahashi et al., "Preparation of FeN Thin Films by Chemical Vapor Deposition Using a Chloride Source," Materials Letters, vol. 42, Mar. 2000, pp. 380-382.
Niimura et al., "Facing Targets Sputtering System for Depositing Co—Cr Perpendicular Magnetic Recording Media," Journal of Vacuum Science Technology, vol. 5, No. 1, Jan. 1987, pp. 109-110.
Hou et al., "SmCo5/Fe Nanocomposites Synthesized from Reductive Annealing of Oxide Nanoparticles," Applied Physics Letters, vol. 91, Oct. 12, 2007, 3 pp.
Takahashi et al., "New Soft Magnetic Material of α'—Fe—C With High Bs," Journal of Magnetism and Magnetic Materials, vol. 239, Nos. 1-3, Feb. 1, 2002, pp. 479-483.
Zhang et al., "Shift of the Eutectoid Point in the Fe—C Binary System by a High Magnetic Field," Journal of Physics D: Applied Physics, vol. 40, Oct. 19, 2007, pp. 6501-6506.
Tsuchiya et al., "Spin Transition in Magnesiovviistite in Earth's Lower Mantle," Physical Review Letters, vol. 94, May 18, 2006, 4 pp.
Liu et al., "Nucleation Behavior of Bulk Ni—Cu Alloy and Pure Sb in High Magnetic Fields," Journal of Crystal Growth, vol. 321, Mar. 2, 2011, pp. 167-170.
Liu et al., "Effects of High Magnetic Fields on Solidification Microstructure of Al—Si Alloys," Journal of Material Science, vol. 46, Oct. 22, 2010, pp. 1628-1634.
Okunev et al., "The Low-Temperature Electric Conductivity of YBaCuO and LaSrMnO Dielectric Films Obtained by a Pulsed Laser Sputter Deposition Technique," Technical Physics Letters, vol. 26, No. 10, May 6, 2000, pp. 903-906.
Anisimov et al., "Density-Functional Calculation of Effective Coulomb Interactions in Metals," Physical Review B, vol. 43, No. 10, Apr. 1, 1991, pp. 7570-7574.
Anisimov et al., "Band-Structure Description of Mott Insulators (NiO, MnO, FeO, CoO)," Journal of Physics: Condensed Matter, vol. 2, Apr. 30, 1990, pp. 3973-3987.
Anisimov et al., "First-Principles Calculations of the Electronic Structure and Spectra of Strongly Correlated Systems: the LDA+U Method," Journal of Physics: Condensed Matter, vol. 9, Jan. 27, 1997, pp. 767-808.
Anisimov et al., "Band Theory and Mott Insulators: Hubbard U Instead of Stoner I," Physical Review B, vol. 44, No. 3, Jul. 15, 1991, pp. 943-954.
Po et al., "Extended DFT + U + V Method With On-Site and Inter-Site Electronic Interactions," Journal of Physics: Condensed Matter, vol. 22, Jan. 19, 2010, 12 pp.
Bao et al., "Synthesis and Properties of α"—Fe16N2 in Magnetic Particles," Journal of Applied Physics, vol. 75, No. 10, May 15, 1994, pp. 5870-5872.
Lauter et al., "Highlights from the Magnetism Reflectometer at the SNS," Physica B, vol. 404, Sep. 1, 2009, pp. 2543-2546.
Godlevsky et al., "Soft Tetragonal Distortions in Ferromagnetic Ni2MnGa and Related Materials from First Principles," Physical Review B, vol. 63, Mar. 2, 2001, 5 pp.
Wang et al., "Growth, Structural, and Magnetic Properties of Iron Nitride Thin Films Deposited by dc Magnetron Sputtering," Applied Surface Science, vol. 220, May 20, 2003, pp. 30-39.
Rui et al., "In-Cluster-Structured Exchange-Coupled Magnets with High Energy Densities," Applied Physics Letters, vol. 89, Sep. 19, 2006, 3 pp.
Pickett et al., "Reformulation of the LDA + U Method for a Local-Orbital Basis," Physical Review B, vol. 58, No. 3, Jul. 15, 1998, pp. 1201-1209.
Kohn et al., "Self-Consistent Equations Including Exchange and Correlation Effects," Physical Review, vol. 140, No. 4A, Nov. 15, 1965, pp. 1133-1138.
Gong et al., "Mechanically Alloyed Nanocomposite Magnets," Journal of Applied Physics, vol. 75, No. 10, May 15, 1994, pp. 6649-6651.
Li et al., "Effect of Assistant rf Field on Phase Composition of Iron Nitride Film Prepared by Magnetron Sputtering Process," Journal of Vaccuum Science & Technology A, vol. 24, No. 1, Jan./Feb. 2006, pp. 170-173.
Liu et al., "Nanocrystalline Soft Magnetic Ribbon with α"—Fe16N2 Nanocrystallites Embedded in Amorphous Matrix," Journal of Magnetism and Magnetic Materials, vol. 320, Jun. 10, 2008, pp. 2752-2754.
Wallace et al., "Enhanced Fe Moment in Nitrogen Martensite and Fe16N2 (Invited)," Journal of Applied Physics, vol. 76, No. 10, Nov. 15, 1994, pp. 6648-6652.
Wang et al., "Searching, Fabricating and Characterizing Magnetic Materials With Giant Saturation Magnetization," TMRC 2014, Aug. 11, 2014, 2 pp.

(56) References Cited

OTHER PUBLICATIONS

First Examination Report from counterpart Australian Application No. 2012296365, dated Mar. 15, 2016, 4 pp.
First Office Action, and translation thereof, from counterpart Chinese Application No. 201280047372.9, dated Feb. 2, 2016, 12 pp.
Notice of Reasons for Rejection, and translation thereof, from counterpart Japanese Application No. 2014-526250, dated Jun. 28, 2016, 12 pp.
Notice of Acceptance from counterpart Australian Application No. 2012296365, dated Sep. 1, 2016, 2 pp.
Response to Examination Report dated Mar. 15, 2016, from counterpart Australian Application No. 2012296365, filed Aug. 5, 2016, 20 pp.
Stäblein, "Chapter 7: Hard Ferrites and Plastoferrites," Handbook of Ferromagnetic Materials, vol. 3, 1982, 162 pp. (Applicant points out, in accordance with MPEP 609.04(a), that the year of publication, 1982, is sufficiently earlier than the effective U.S. filing date, Aug. 17, 2011, so that the particular month of publication is not in issue.).
Murata et al., "Physical Properties of Steel and Nitrogen," Japan, Agne Gijutsu Center Inc., Dec. 15, 2005, 8 pp.
U.S. Appl. No. 15/129,439, by Wang et al., filed Sep. 27, 2016.
U.S. Appl. No. 62/107,733, by Wang et al., filed Jan. 26, 2015.
U.S. Appl. No. 62/107,748, by Wang et al., filed Jan. 26, 2015.
U.S. Appl. No. 62/035,245, by Wang et al., filed Aug. 8, 2014.
U.S. Appl. No. 62/035,230, by Wang et al., filed Aug. 8, 2014.
U.S. Appl. No. 62/107,700, by Wang et al., filed Jan. 26, 2015.
U.S. Appl. No. 61/840,221, by Wang et al., filed Jun. 27, 2013.
U.S. Appl. No. 61/840,248 by Wang et al., filed Jun. 27, 2013.
International Search Report and Written Opinion of corresponding international patent application No. PCT/US2012/051382, dated Apr. 29, 2013, 15 pp.
Invitation to Pay Additional Fees, and, Where Applicable, Protest Fee from corresponding international patent application No. PCT/US2012/051382, dated Dec. 21, 2012, 6 pp.
Notification of Transmittal of the International Preliminary Report on Patentability from corresponding international patent application No. PCT/U52012/051382, dated Dec. 10, 2013, 23 pp.
Reply to Written Opinion dated, Apr. 29, 2013, from corresponding international patent application No. PCT/ US2012/051382, dated Jul. 29, 2013.
Reply to Second Written Opinion dated Sep. 24, 2013, from corresponding international patent application No. PCT/US2012/051382, dated Nov. 21, 2013.
Written Opinion of the International Preliminary Examining Authority from corresponding international application No. PCT/US2012/051382, dated Sep. 24, 2013, 7 pp.
Cho, "The Best Refrigerator Magnet Ever?," Science/AAAD News, Science Now, Mar. 19, 2010, retrieved from the Internet http://news.sciencemag.org/physics/2010/03/best-refrigerator-magnet-ever?sms_ss=email, 2 pp.
Ji et al., "Epitaxial high saturation magnetization FeN thin films on Fe(001) seeded GaAs(001) single crystal wafer using facing target sputterings," Journal of Applied Physics, Apr. 12, 2011, 3 pp.
Ji et al., "N site ordering effect on partially ordered $Fe_{16}N_2$," Applied Physics Letters, 98 (9), Mar. 1, 2011, 3 pp.
Ji et al., "Strain Induced Giant Magnetism in Epitaxial $Fe_{16}N_2$ Thin Film," Applied Physics Letters, vol. 102(072411), Feb. 21, 2013, 5 pp.
Ji et al., "Theory of giant saturation magnetization in $\alpha''$—$Fe_{16}N_2$: Role of partial localization in ferromagnetism of 3d transition metals," New Journal of Physics, 12, 063032, Jun. 17 2010, 9 pp.
"New Compound Opens Way to EV Magnet without Rare Earths," Nikkei.com morning edition, Mar. 4, 2011, 1 pp.
Takahashi, "Discovery of $Fe_{16}N_2$ with Giant Magnetic Moment and Its Future View," IEEE Translation Journal of Magnetics in Japan, IEEE Inc., New York, US, vol. 6, No. 12, Dec. 1, 1991, pp. 1024-1038, XP011247702.
Wang et al., "Fabrication of $Fe_{16}N_2$ Films by Sputtering Process and Experimental Investigation of Origin of Giant Saturation Magnetization in $Fe_{16}N_2$," IEEE Transactions on Magnetics, vol. 48(5), May 2012, 8 pp.
Yamamoto et al., "Formation of $Fe_{16}N_2$ in deformed iron by ion implantation method," Ion Implantation Technology Proceedings, 1998 International Conference on Kyoto, Japan, Jun. 22-26 1998, Piscataway, NJ, USA, IEEE, US, vol. 2, pp. 877-880, XP010362177.
Inokuti, Y., Formation of $Fe_3N$, $Fe_4N$ And $Fe_{16}N_2$ on the Surface of Iron, Metallurgical Transactions. A. Physical Metallurgy and Materials Science, USA, Apr. 1975, vol. 6, No. 4, p. 773-784, ISSN:0360-2133.

IRON NITRIDE PERMANENT MAGNET AND TECHNIQUE FOR FORMING IRON NITRIDE PERMANENT MAGNET

This application is a national stage entry under 35 U.S.C. § 371 of International Application No. PCT/US2012/051382, filed Aug. 17, 2012, which claims the benefit of application No. 61/524,423, filed Aug. 17, 2011. The entire contents of International Application No. PCT/US2012/051382 and U.S. Provisional Patent Application 61/524,423 are incorporated herein by reference.

The invention was made with government support under award DE-AR0000199 awarded by the Department of Energy. The government has certain rights to the invention.

GOVERNMENT RIGHTS

This invention was made with government support under ARPA-E 0472-1595 awarded by the Dept. of Energy. The government has certain rights in the invention.

TECHNICAL FIELD

The disclosure relates to permanent magnets and techniques for forming permanent magnets.

BACKGROUND

Permanent magnets play a role in many electro-mechanical systems, including, for example, alternative energy systems. For example, permanent magnets are used in electric motors or generators, which may be used in vehicles, wind turbines, and other alternative energy mechanisms. Many permanent magnets in current use include rare earth elements, such as neodymium. These rare earth elements are in relatively short supply, and may face increased prices and/or supply shortages in the future. Additionally, some permanent magnets that include rare earth elements are expensive to produce. For example, fabrication of NdFeB magnets generally includes crushing material, compressing the material, and sintering at temperatures over 1000° C.

SUMMARY

In general, this disclosure is directed to bulk permanent magnets that include $Fe_{16}N_2$ and techniques for forming bulk permanent magnets that include $Fe_{16}N_2$. Bulk $Fe_{16}N_2$ permanent magnets may provide an alternative to permanent magnets that include a rare earth element. Iron and nitrogen are abundant elements, and thus are relatively inexpensive and easy to procure. Additionally, experimental evidence gathered from thin film $Fe_{16}N_2$ permanent magnets suggests that bulk $Fe_{16}N_2$ permanent magnets may have desirable magnetic properties, including an energy product of as high as about 134 MegaGauss*Oerstads (MGOe), which is about two times the energy product of NdFeB (about 60 MGOe). The high energy product of $Fe_{16}N_2$ magnets may provide high efficiency for applications in electric motors, electric generators, and magnetic resonance imaging (MRI) magnets, among other applications.

In some aspects, the disclosure describes techniques for forming bulk $Fe_{16}N_2$ permanent magnets. The techniques may generally include straining an iron wire or sheet, that includes at least one body centered cubic (bcc) iron crystal, along a direction substantially parallel to a <001> crystal axis of the at least one bcc iron crystal. In some examples, the <001> crystal axis of the at least one iron wire or sheet may lie substantially parallel to a major axis of the iron wire or sheet. The techniques then include exposing the iron wire or sheet to a nitrogen environment to introduce nitrogen into the iron wire or sheet. The techniques further include annealing the nitridized iron wire or sheet to order the arrangement of iron and nitrogen atoms and form the $Fe_{16}N_2$ phase constitution in at least a portion of the iron wire or sheet. In some examples, multiple $Fe_{16}N_2$ wires or sheets can be assembled with substantially parallel <001> axes and the multiple $Fe_{16}N_2$ wires or sheets can be pressed together to form a permanent magnet including a $Fe_{16}N_2$ phase constitution.

In some aspects, the disclosure describes techniques for forming single crystal iron nitride wires and sheets. In some examples, a Crucible technique, such as that described herein, may be used to form single crystal iron nitride wires and sheets. In addition to such Crucible techniques, such single crystal iron wires and sheets may be formed by either the micro melt zone floating or pulling from a micro shaper. Furthermore, techniques for forming crystalline textured (e.g., with desired crystalline orientation along the certain direction of wires and sheets) iron nitride wires and sheet are also described.

In one example, the disclosure is directed to a method that includes straining an iron wire or sheet comprising at least one iron crystal in a direction substantially parallel to a <001> crystal axis of the iron crystal; nitridizing the iron wire or sheet to form a nitridized iron wire or sheet; and annealing the nitridized iron wire or sheet to form a $Fe_{16}N_2$ phase constitution in at least a portion of the nitridized iron wire or sheet.

In another example, the disclosure is directed to a system that includes means for straining an iron wire or sheet comprising at least one body centered cubic (bcc) iron crystal in a direction substantially parallel to a <001> axis of the bcc iron crystal; means for heating the strained iron wire or sheet; means for exposing the strained iron wire or sheet to an atomic nitrogen precursor to form a nitridized iron wire or sheet; and means for annealing the nitridized iron wire or sheet to form a $Fe_{16}N_2$ phase constitution in at least a portion of the nitridized iron wire or sheet.

In another aspect, the disclosure is directed to a method that includes urea as an effective atomic nitrogen source to diffuse nitrogen atoms into iron to form a nitridized iron wire or sheet or bulk.

In another aspect, the disclosure is directed to a permanent magnet that includes a wire comprising a $Fe_{16}N_2$ phase constitution.

In another aspect, the disclosure is directed to a permanent magnet that includes a sheet comprising a $Fe_{16}N_2$ phase constitution.

In another aspect, the disclosure is directed to a permanent magnet that includes a $Fe_{16}N_2$ phase constitution. According to this aspect of the disclosure, the permanent magnet has a size in at least one dimension of at least 0.1 mm The details of one or more examples of the disclosure are set forth in the accompanying drawings and the description below. Other features, objects, and advantages of the disclosure will be apparent from the description and drawings, and from the claims.

DETAILED DESCRIPTION

In general, the disclosure is directed to permanent magnets that include a $Fe_{16}N_2$ phase constitution and techniques for forming permanent magnets that include a $Fe_{16}N_2$ phase constitution. In particular, the techniques described herein are used to form bulk phase $Fe_{16}N_2$ permanent magnets.

$Fe_{16}N_2$ permanent magnets may provide a relatively high energy product, for example, as high as about 134 MGOe when the $Fe_{16}N_2$ permanent magnet is anisotropic. In examples in which the $Fe_{16}N_2$ magnet is isotropic, the energy product may be as high as about 33.5 MGOe. The energy product of a permanent magnetic is proportional to the product of remanent coercivity and remanent magnetization. For comparison, the energy product of $Nd_2Fe_{14}B$ permanent magnet may be as high as about 60 MGOe. A higher energy product can lead to increased efficiency of the permanent magnet when used in motors, generators, or the like.

Figure 1:
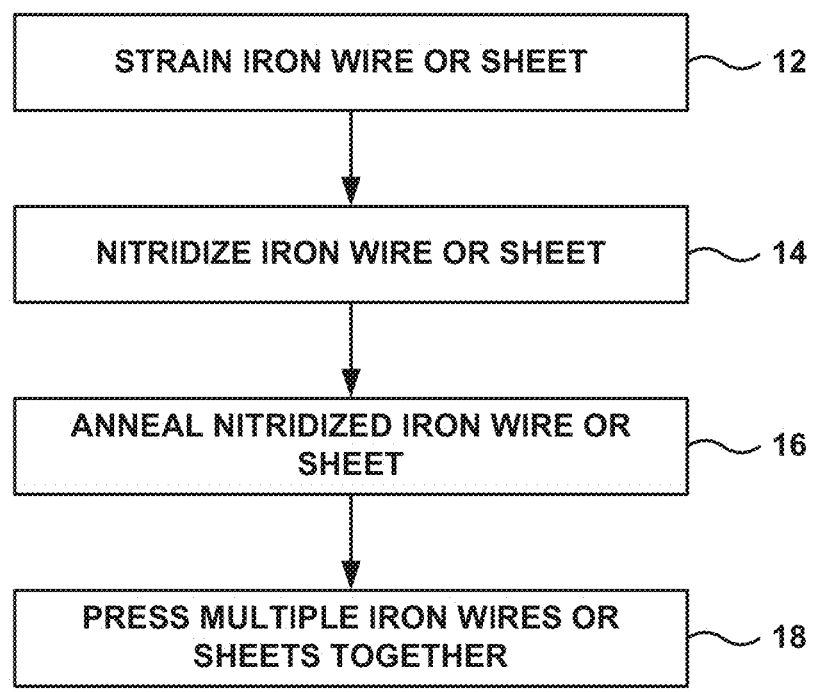
FIG. 1 is a flow diagram that illustrates an example technique for forming a bulk $Fe_{16}N_2$ permanent magnet.
Figure 2:
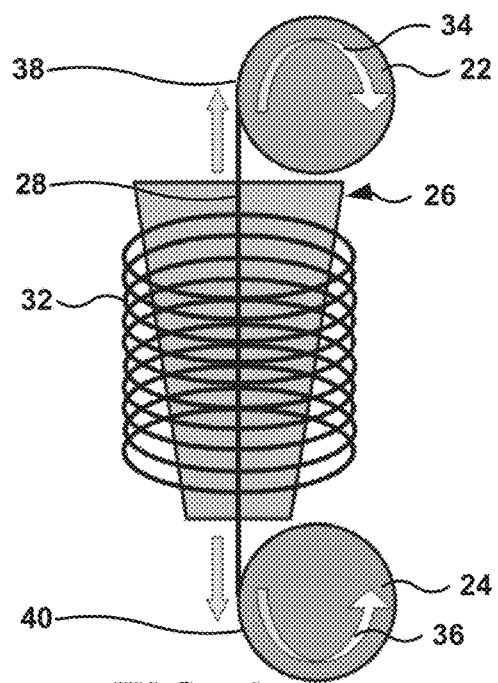
FIG. 2 is a conceptual diagram illustrating an example apparatus with which an iron wire or sheet can be strained and exposed to nitrogen.
Figure 3:
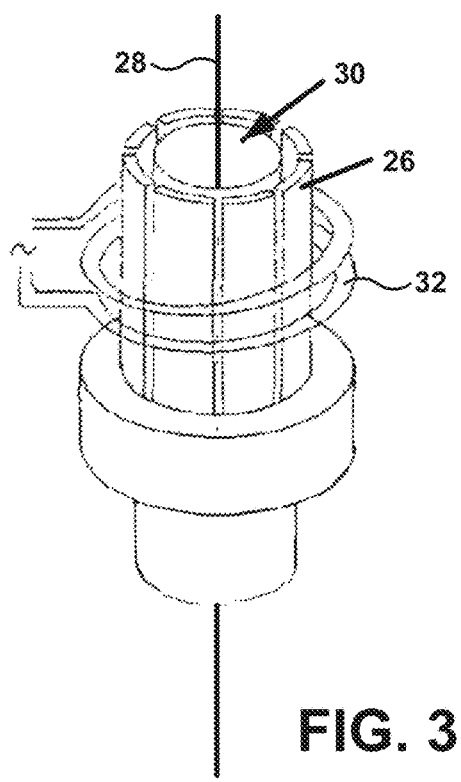
FIG. 3 illustrates further detail of one example of the Crucible heating stage shown in FIG. 2.

FIG. 1 is a flow diagram that illustrates an example technique for forming a bulk $Fe_{16}N_2$ permanent magnet. The technique of FIG. 1 will be described with concurrent reference to FIGS. 2-5. FIG. 2 illustrates a conceptual diagram of an apparatus with which the iron wire or sheet can be strained and exposed to nitrogen. FIG. 3 illustrates further detail of one example of the Crucible heating stage shown in FIG. 2.

The example apparatus of FIG. 2 includes a first roller 22, a second roller 24, and a Crucible heating stage 26. First roller 22 and second roller 24 are configured to receive a first end 38 and a second end 40, respectively, of an iron wire or sheet 28. Iron wire or sheet 28 defines a major axis between first end 38 and second end 40. As best seen in FIG. 3, iron wire or sheet 28 passes through an aperture 30 defined by Crucible heating stage 26. Crucible heating stage 26 includes an inductor 32 that surrounds at least a portion of the aperture 30 defined by Crucible heating stage 26.

The example technique of FIG. 1 includes straining iron wire or sheet 28 along a direction substantially parallel (e.g., parallel or nearly parallel) to a <001> axis of at least one iron crystal in the iron wire or sheet 28 (12). In some examples, iron wire or sheet 28 is formed of iron having a body centered cubic (bcc) crystal structure.

In some examples, iron wire or sheet 28 is formed of a single bcc crystal structure. In other examples, iron wire or sheet 28 may be formed of a plurality of bcc iron crystals. In some of these examples, the plurality of iron crystals are oriented such that at least some, e.g., a majority or substantially all, of the <001> axes of individual unit cells and/or crystals are substantially parallel to the direction in which strain is applied to iron wire or sheet 28. For example, when the iron is formed as iron wire or sheet 28, at least some of the <001> axes may be substantially parallel to the major axis of the iron wire or sheet 28, as shown in FIGS. 2 and 3. As noted above, in some examples, single crystal iron nitride wires and sheets may be formed using Crucible techniques. In addition to such Crucible techniques, single crystal iron wires and sheets may be formed by either the micro melt zone floating or pulling from a micro shaper to form iron wire or sheet 28.

Figure 13:
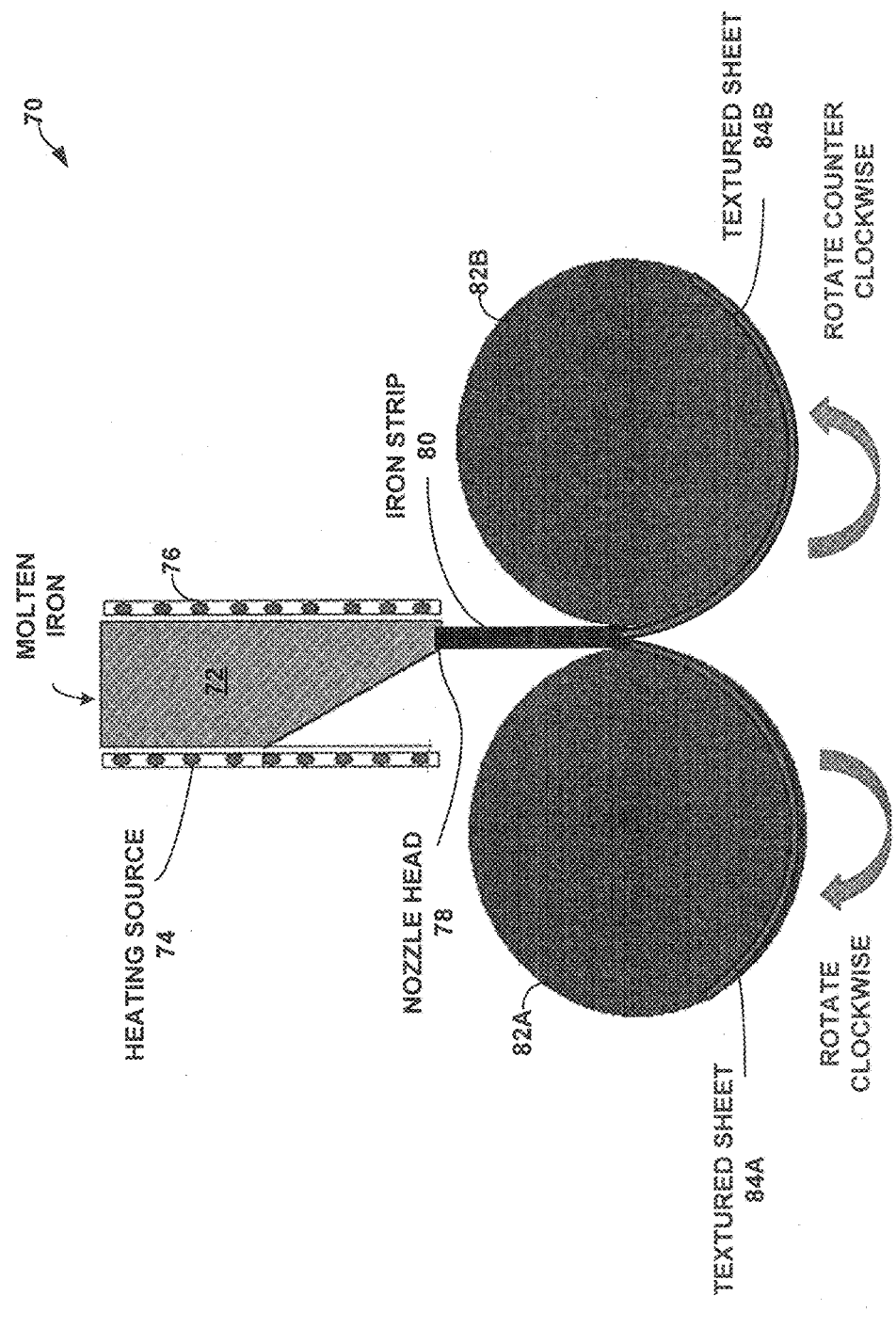
FIG. 13 is a conceptual diagram illustrating an example apparatus for fast belt casting to texture an example iron nitride wire or sheet.

In some examples, iron wire or sheet 28 may have a crystalline textured structure. Techniques may be used to form crystalline textured (e.g., with desired crystalline orientation along the certain direction of wires and sheets) iron wires or sheet 28. FIG. 13 is a conceptual diagram illustrating one example apparatus 70 for fast belt casting to texture an example iron wire or sheet, such as iron wire or sheet 28. As shown fast belt casting apparatus 70 includes ingot chamber 76 which contains molten iron ingot 72, which may be heated by heating source 74, e.g., in the form of a heating coil. Ingot 72 flow out of chamber 76 through nozzle head 78 to form iron strip 80. Iron strip 80 is fed into the gap zone between surface of pinch rollers 82A and 82B, which are rotated in opposite directions. In some examples, the rotation of roller 82A and 82B may vary from approximately 10 to 1000 rotations per minute. Iron strip cools on pinch rollers 82A and 82B and, after being pressed between pinch rollers 82A and 82B, forms textured iron strips 84A and 84B. In some examples, texted iron strips 84A and 84B may form textured iron ribbon with thickness between, e.g., about one micrometer and about a millimeter (either individually or after compression of multiple iron strips.

Figure 4:
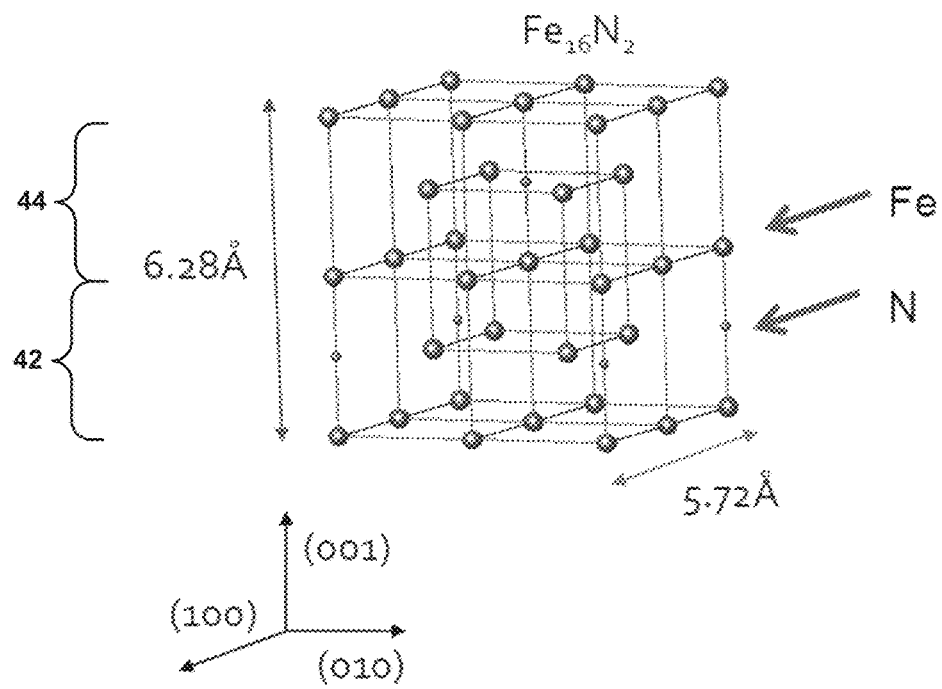
FIG. 4 is a conceptual diagram that shows eight (8) iron unit cells in a strained state with nitrogen atoms implanted in interstitial spaces between iron atoms.

In an unstrained iron bcc crystal lattice, the <100>, <010>, and <001> axes of the crystal unit cell may have substantially equal lengths. However, when a force, e.g., a tensile force, is applied to the crystal unit cell in a direction substantially parallel to one of the crystal axes, e.g., the <001> crystal axis, the unit cell may distort and the iron crystal structure may be referred to as body centered tetragonal (bct). For example, FIG. 4 is a conceptual diagram that shows eight (8) iron unit cells in a strained state with nitrogen atoms implanted in interstitial spaces between iron atoms. The example in FIG. 4 includes four iron unit cells in a first layer 42 and four iron unit cells in a second layer 44. Second layer 44 overlays first layer 42 and the unit cells in second layer 44 are substantially aligned with the unit cells in first layer 42 (e.g., the <001> crystal axes of the unit cells are substantially aligned between the layers). As shown in FIG. 4, the iron unit cells are distorted such that the length of the unit cell along the <001> axis is approximately 3.14 angstroms (Å) while the length of the unit cell along the <010> and <100> axes is approximately 2.86 Å. The iron unit cell may be referred to as a bct unit cell when in the strained state. When the iron unit cell is in the strained state, the <001> axis may be referred to as the c-axis of the unit cell.

The stain may be exerted on iron wire or sheet 28 using a variety of strain inducing apparatuses. For example, as shown in FIG. 2, first end 38 and second end 40 of iron wire or sheet 28 may received by (e.g., wound around) first roller 22 and second roller 24, respectively, and rollers 22, 24 may be rotated in opposite directions (indicated by arrows 34 and 35 in FIG. 2) to exert a tensile force on the iron wire or sheet 28.

Figure 6:
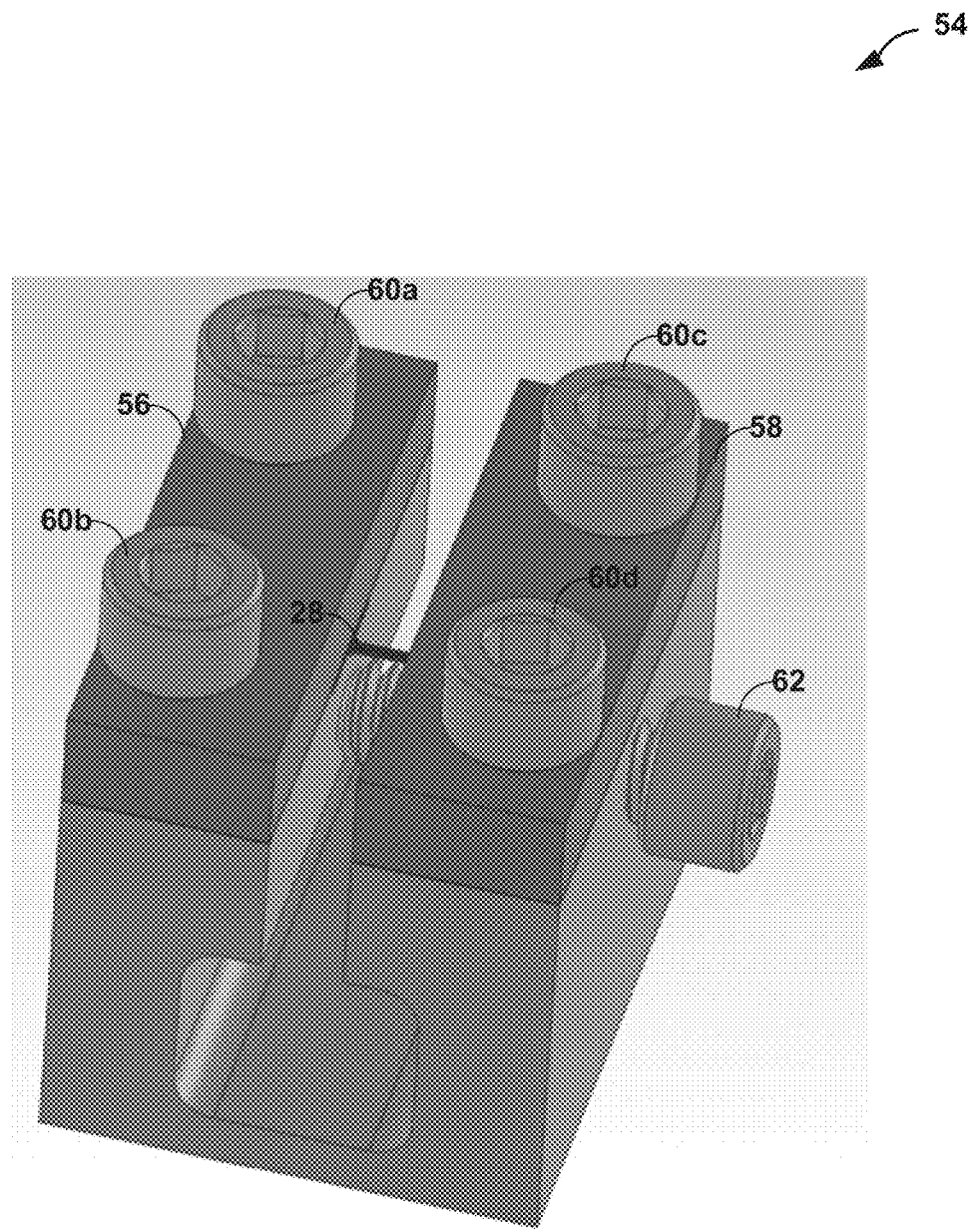
FIG. 6 is a conceptual diagram illustrating another example apparatus with which an iron wire or sheet can be strained.

In other examples, opposite ends of iron wire or sheet 28 may be gripped in mechanical grips, e.g., clamps, and the mechanical grips may be moved away from each other to exert a tensile force on the iron wire or sheet 28. FIG. 6 is a conceptual diagram illustrating another example apparatus with which iron wire or sheet 28 can be strained as described herein. As shown, apparatus 54 includes clamps 56 and 58 which may secure opposing ends of iron wire or sheet 28 by tightening screws 60a-d. Once iron wire or sheet is secured in apparatus 19, bolt 62 may be turned to rotate the threaded body of bolt 62 to increase the distance between clamps 56 and 58 and exert a tensile force on iron wire or sheet 28. The value of the elongation or stress generated by the rotation of bolt 62 may be measured by any suitable gauge, such as, e.g., a strain gauge. In some examples, apparatus 54 may be placed in a furnace (e.g., a tube furnace) or other heated environment so that iron wire or sheet 28 may be heated during and/or after iron wire or sheet 28 is stretched by apparatus 54.

A strain inducing apparatus may strain iron wire or sheet 28 to a certain elongation. For example, the strain on iron wire or sheet 28 may be between about 0.3% and about 7%. In other examples, the strain on iron wire or sheet 28 may be less than about 0.3% or greater than about 7%. In some examples, exerting a certain strain on iron wire or sheet 28 may result in a substantially similar strain on individual unit cells of the iron, such that the unit cell is elongated along the <001> axis between about 0.3% and about 7%.

Iron wire or sheet 28 may have any suitable diameter and/or thickness. In some examples, a suitable diameter and/or thickness may be on the order of micrometers (μm) or millimeters (mm) For example, an iron wire may have a diameter greater than about 10 μm (0.01 mm). In some examples, the iron wire has a diameter between about 0.01 mm and about 1 mm, such as about 0.1 mm. Similarly, an iron sheet may have any suitable thickness and/or width. In some examples, the iron sheet may have a thickness greater than about 0.01 mm, such as between about 0.01 mm and about 1 mm, or about 0.1 mm. In some implementations, a width of the iron sheet may be greater than a thickness of the iron sheet.

A diameter of the iron wire or cross-sectional area of the iron sheet (in a plane substantially orthogonal to the direction in which the iron sheet is stretched/strained) may affect an amount of force that must be applied to iron wire or sheet 28 to result in a given strain. For example, the application of approximately 144 N of force to an iron wire with a diameter of about 0.1 mm may result in about a 7% strain. As another example, the application of approximately 576 N of force to an iron wire with a diameter of about 0.2 mm may result in about a 7% strain. As another example, the application of approximately 1296 N of force to an iron wire with a diameter of about 0.3 mm may result in about a 7% strain. As another example, the application of approximately 2304 N of force to an iron wire with a diameter of about 0.4 mm may result in about a 7% strain. As another example, the application of approximately 3600 N of force to an iron wire with a diameter of about 0.5 mm may result in about a 7% strain.

In some examples, iron wire or sheet 28 may include dopant elements which serve to stabilize the $Fe_{16}N_2$ phase constitution once the $F_{e16}N_2$ phase constitution has been formed. For example, the phase stabilization dopant elements may include cobalt (Co), titanium (Ti), copper (Cu), zinc (Zn), or the like.

As the strain inducing apparatus exerts the strain on iron wire or sheet 28 and/or once the strain inducing apparatus is exerting a substantially constant strain on the iron wire or sheet 28, iron wire or sheet 28 may be nitridized (14). In some examples, during the nitridization process, iron wire or sheet 28 may be heated using a heating apparatus. One example of a heating apparatus that can be used to heat iron wire or sheet 28 is Crucible heating stage 26, shown in FIGS. 2 and 3.

Crucible heating stage 26 defines aperture 30 through which iron wire or sheet 28 passes (e.g., in which a portion of iron wire or sheet 28 is disposed). In some examples, no portion of Crucible heating stage 26 contacts iron wire or sheet 28 during the heating of iron wire or sheet 28. In some implementations, this is advantageous as it lower a risk of unwanted elements or chemical species contacting and diffusing into iron wire or sheet 28. Unwanted elements or chemical species may affect properties of iron wire or sheet 28; thus, it may be desirable to reduce or limit contact between iron wire or sheet 28 and other materials.

Crucible heating stage 26 also includes an inductor 32 that surrounds at least a portion of aperture 30 defined by Crucible heating stage 26. Inductor 32 includes an electrically conductive material, such as aluminum, silver, or copper, through which an electric current may be passed. The electric current may by an alternating current (AC), which may induce eddy currents in iron wire or sheet 28 and heat the iron wire or sheet 28. In other examples, instead of using Crucible heating stage 26 to heat iron wire or sheet 28, other non-contact heating sources may be used. For example, a radiation heat source, such as an infrared heat lamp, may be used to heat iron wire or sheet 28. As another example, a plasma arc lamp may be used to heat iron wire or sheet 28.

Regardless of the heating apparatus used to heat iron wire or sheet 28 during the nitridizing process, the heating apparatus may heat iron wire or sheet 28 to temperature for a time sufficient to allow diffusion of nitrogen to a predetermined concentration substantially throughout the thickness or diameter of iron wire or sheet 28. In this manner, the heating time and temperature are related, and may also be affected by the composition and/or geometry of iron wire or sheet 28. For example, iron wire or sheet 28 may be heated to a temperature between about 125° C. and about 600° C. for between about 2 hours and about 9 hours. In some examples, iron wire or sheet 28 may be heated to a temperature between about 500° C. and about 600° C. for between about 2 hours and about 4 hours.

In some examples, iron wire or sheet 28 includes an iron wire with a diameter of about 0.1 mm. In some of these examples, iron wire or sheet 28 may be heated to a temperature of about 125° C. for about 8.85 hours or a temperature of about 600° C. for about 2.4 hours. In general, at a given temperature, the nitridizing process time may be inversely proportional to a characteristic dimension squared of iron wire or sheet 28, such as a diameter of an iron wire or a thickness of an iron sheet.

In addition to heating iron wire or sheet 28, nitridizing iron wire or sheet 28 (14) includes exposing iron wire or sheet 28 to an atomic nitrogen substance, which diffuses into iron wire or sheet 28. In some examples, the atomic nitrogen substance may be supplied as diatomic nitrogen ($N_2$), which is then separated (cracked) into individual nitrogen atoms. In other examples, the atomic nitrogen may be provided from another atomic nitrogen precursor, such as ammonia ($NH_3$). In other examples, the atomic nitrogen may be provided from urea ($CO(NH_2)_2$).

The nitrogen may be supplied in a gas phase alone (e.g., substantially pure ammonia or diatomic nitrogen gas) or as a mixture with a carrier gas. In some examples, the carrier gas is argon (Ar). The gas or gas mixture may be provided at any suitable pressure, such as between about 0.001 Torr (about 0.133 pascals (Pa)) and about 10 Torr (about 1333 Pa), such as between about 0.01 Torr (about 1.33 Pa) and about 0.1 Torr (about 13.33 Torr). In some examples, when the nitrogen is delivered as part of a mixture with a carrier gas, the partial pressure of nitrogen or the nitrogen precursor (e.g., $NH_3$) may be between about 0.02 and about 0.1.

The nitrogen precursor (e.g., $N_2$ or $NH_3$) may be cracked to form atomic nitrogen substances using a variety of techniques. For example, the nitrogen precursor may be heated using radiation to crack the nitrogen precursor to form atomic nitrogen substances and/or promote reaction between the nitrogen precursor and iron wire or sheet 28. As another example, a plasma arc lamp may be used to split the nitrogen precursor to form atomic nitrogen substances and/or promote reaction between the nitrogen precursor and iron wire or sheet 28.

In some examples, iron wire or sheet 28 may be nitridized (14) via a urea diffusion process, in which urea is utilized as a nitrogen source (e.g., rather than diatomic nitrogen or ammonia). Urea (also referred to as carbamide) is an organic compound with the chemical formula $CO(NH_2)_2$ that may be used in some cases as a nitrogen release fertilizer. To nitridize iron wire or sheet 28 (14), urea may heated, e.g., within a furnace with iron wire or sheet 28, to generate decomposed nitrogen atoms which may diffuse into iron wire or sheet 28. As will be described further below, the constitution of the resulting nitridized iron material may controlled to some extent by the temperature of the diffusion process as well as the ratio (e.g., the weight ratio) of iron to urea used for the process. In other examples, iron wire or sheet 28 may be nitridized by an implantation process similar to that used in semiconductor processes for introducing doping agents.

Figure 7:
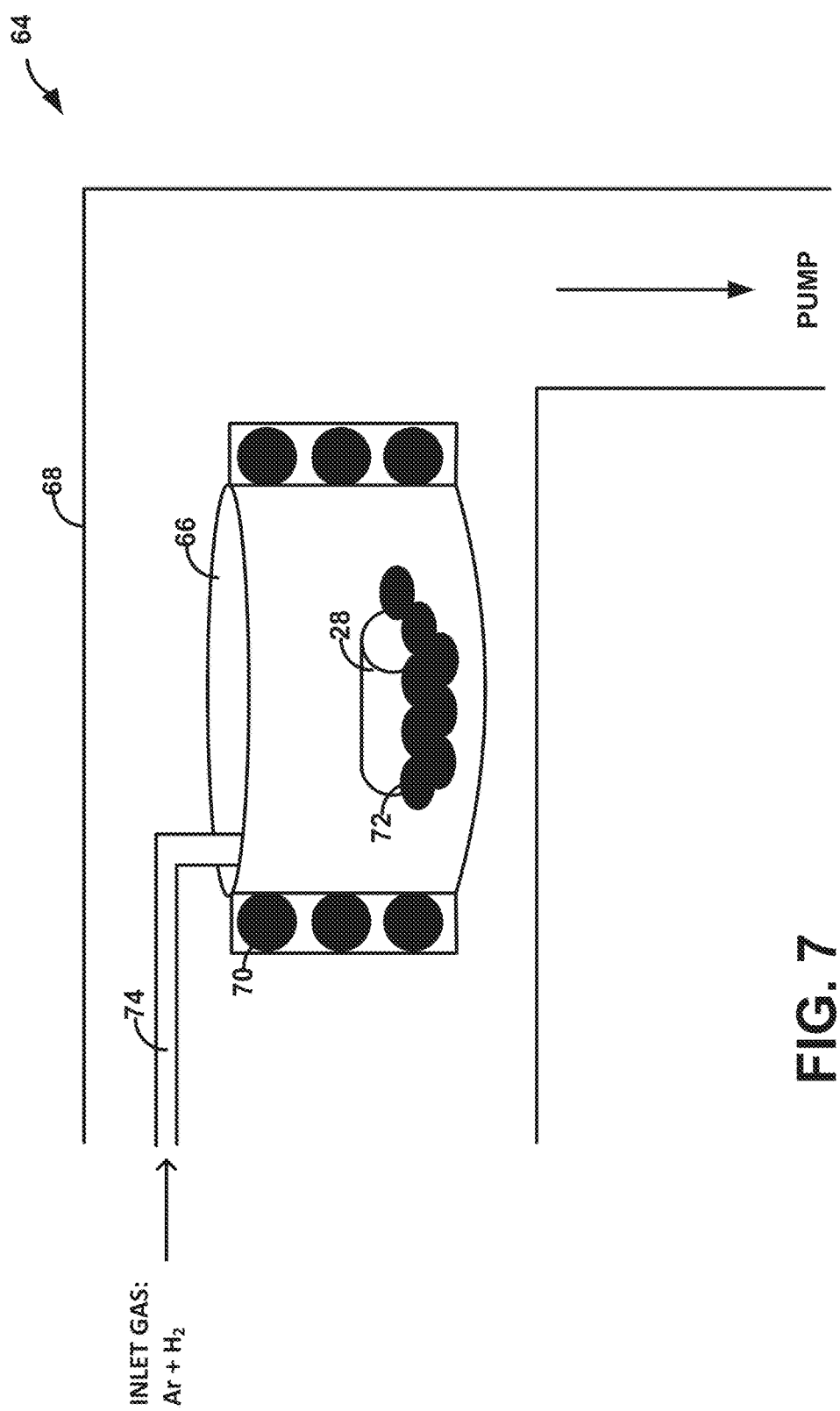
FIG. 7 is a schematic diagram illustrating an example apparatus that may be used for nitriding an iron wire or sheet via a urea diffusion process.

FIG. 7 is a schematic diagram illustrating an example apparatus 64 that may be used for nitriding iron wire or sheet 28 via a urea diffusion process. Such a urea diffusion process may be used to nitriding iron wire or sheet 28, e.g., when having a single crystal iron, a plurality of crystal structure, or textured structure. Moreover, iron materials with different shapes, such as wire, sheet or bulk, can also be diffused using such a process. For wire material, the wire diameter may be varied, e.g., from several micrometers to millimeters. For sheet material, the sheet thickness may be from, e.g., several nanometers to millimeters. For bulk material, the material weight may be from, e.g., about 1 milligram to kilograms.

As shown, apparatus 64 includes crucible 66 within vacuum furnace 68. Iron wire or sheet 28 is located within crucible 66 along with the nitrogen source of urea 72. As shown in FIG. 7, a carrier gas including Ar and hydrogen is fed into crucible 66 during the urea diffusion process. In other examples, a different carrier gas or even no carrier gas may be used. In some examples, the gas flow rate within vacuum furnace 68 during the urea diffusion process may be between approximately 5 standard cubic centimeters per minute (sccm) to approximately 50 sccm, such as, e.g., 20 standard cubic centimeters per minute (sccm) to approximately 50 sccm or 5 standard cubic centimeters per minute (sccm) to approximately 20 sccm.

Heating coils 70 may heat iron wire or sheet 28 and urea 72 during the urea diffusion process using any suitable technique, such as, e.g., eddy current, inductive current, radio frequency, and the like. Crucible 66 may be configured to withstand the temperature used during the urea diffusion process. In some examples, crucible 66 may be able to withstand temperatures up to approximately 1600° C.

Urea 72 may be heated with iron wire or sheet 28 to generate nitrogen that may diffuse into iron wire or sheet 28 to form an iron nitride material. In some examples, urea 72 and iron wire or sheet 28 may heated to approximately 650° C. or greater within crucible 66 followed by cooling to quench the iron and nitrogen mixture to form an iron nitride material having a $Fe_{16}N_2$ phase constitution substantially throughout the thickness or diameter of iron wire or sheet 28. In some examples, urea 72 and iron wire or sheet 28 may heated to approximately 650° C. or greater within crucible 66 for between approximately 5 minutes to approximately 1 hour. In some examples, urea 72 and iron wire or sheet 28 may be heated to between approximately 1000° C. to approximately 1500° C. for several minutes to approximately an hour. The time of heating may depend on nitrogen thermal coefficient in different temperature. For example, if the iron wire or sheet is thickness is about 1 micrometer, the diffusion process may be finished in about 5 minutes at about 1200° C., about 12 minutes at 1100° C., and so forth.

To cool the heated material during the quenching process, cold water may be circulated outside the crucible to rapidly cool the contents. In some examples, the temperature may be decreased from 650° C. to room temperature in about 20 seconds.

As will be described below, in some examples, the temperature of urea 72 and iron wire or sheet 28 may be between, e.g., approximately 200° C. and approximately 150° C. to anneal the iron and nitrogen mixture to form an iron nitride material having a $Fe_{16}N_2$ phase constitution substantially throughout the thickness or diameter of iron wire or sheet 28. Urea 72 and iron wire or sheet 28 may be at the annealing temperature, e.g., between approximately 1 hour and approximately 40 hours. Such an annealing process could be used in addition to or as an alternative to other nitrogen diffusion techniques, e.g., when the iron material is single crystal iron wire and sheet, or textured iron wire and sheet with thickness in micrometer level. In each of annealing and quenching, nitrogen may diffuse into iron wire or sheet 28 from the nitrogen gas or gas mixture including Ar plus hydrogen carrier gas within furnace 68. In some examples, gas mixture may have a composition of approximately 86% Ar+4% $H_2$+10% $N_2$. In other examples, the gas mixture may have a composition of 10% $N_2$+90% Ar or 100% $N_2$ or 100% Ar.

As will be described further below, the constitution of the iron nitride material formed via the urea diffusion process may be dependent on the weight ratio of urea to iron used. As such, in some examples, the weight ratio of urea to iron may be selected to form an iron nitride material having a $Fe_{16}N_2$ phase constitution. However, such a urea diffusion process may be used to form iron nitride materials other than that having a $Fe_{16}N_2$ phase constitution, such as, e.g., $Fe_2N$, $Fe_3N$, $Fe_4N$, $Fe_8N$, and the like. Moreover, the urea diffusion process may be used to diffuse nitrogen into materials other than iron. For example, such an urea diffusion process may be used to diffuse nitrogen into there are Indium, FeCo, FePt, CoPt, Cobalt, Zn, Mn, and the like.

Regardless of the technique used to nitridize iron wire or sheet 28 (14), the nitrogen may be diffused into iron wire or sheet 28 to a concentration of about 8 atomic percent (at. %) to about 14 at. %, such as about 11 at. %. The concentration of nitrogen in iron may be an average concentration, and may vary throughout the volume of iron wire or sheet 28. In some examples, the resulting phase constitution of at least a portion of the nitridized iron wire or sheet 28 (after nidtridizing iron wire or sheet 28 (14)) may be α' phase $Fe_8N$. The $Fe_8N$ phase constitution is the chemically disordered counterpart of chemically-ordered $Fe_{16}N_2$ phase. A $Fe_8N$ phase constitution is also has a bct crystal cell, and can introduce a relatively high magnetocrystalline anisotropy.

Figure 8:
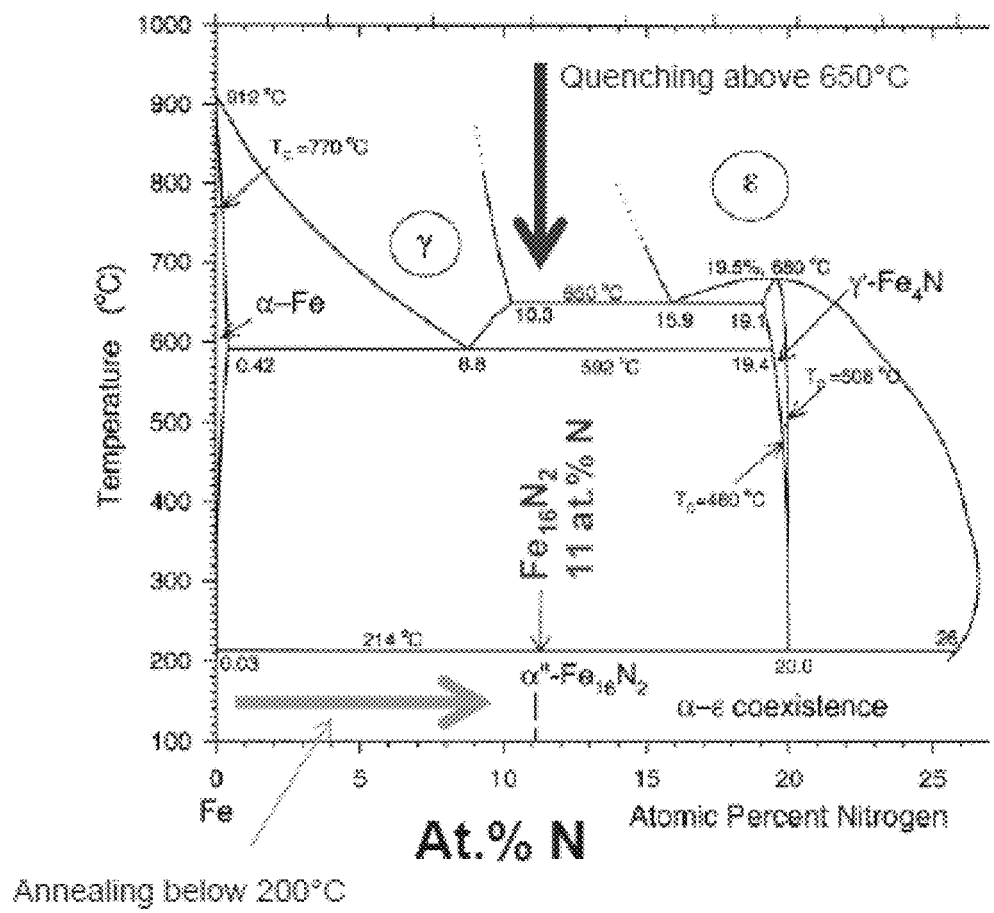
FIG. 8 is an iron nitride phase diagram.

In some examples, the nitridized iron wire or sheet 28 may be α" phase $Fe_{16}N_2$. FIG. 8 is an iron nitrogen phase diagram. As indicated in FIG. 8, at an atomic percent of approximately 11 at. % N, α" phase $Fe_{16}N_8$ may be formed by quenching an Fe—N mixture at a temperature above approximately 650° C. for a suitable amount of time. Additionally, at an atomic percent of approximately 11 at. % N, α" phase $Fe_{16}N_8$ may be formed by annealing an Fe—N mixture at a temperature below approximately 200° C. for a suitable amount of time In some examples, once iron wire or sheet 28 has been nitridized (14), iron wire or sheet 28 may be annealed at a temperature for a time to facilitate diffusion of the nitrogen atoms into appropriate interstitial spaces within the iron lattice to form $Fe_{16}N_2$ (16). FIG. 4 illustrates an example of the appropriate interstitial spaces of the iron crystal lattice in which nitrogen atoms are positioned. In some examples, the nitridized iron wire or sheet 28 may be annealed at a temperature between about 100° C. and about 300° C. In other examples, the annealing temperature may be about 126.85° C. (about 400 Kelvin). The nitridized iron wire or sheet 28 may be annealed using Crucible heating stage 26, a plasma arc lamp, a radiation heat source, such as an infrared heat lamp, an oven, or a closed retort.

The annealing process may continue for a predetermined time that is sufficient to allow diffusion of the nitrogen atoms to the appropriate interstitial spaces. In some examples, the annealing process continues for between about 20 hours and about 100 hours, such as between about 40 hours and about 60 hours. In some examples, the annealing process may occur under an inert atmosphere, such as Ar, to reduce or substantially prevent oxidation of the iron. In some implementations, while iron wire or sheet 28 is annealed (16) the temperature is held substantially constant.

Once the annealing process has been completed, iron wire or sheet 28 may include a $Fe_{16}N_2$ phase constitution. In some examples, at least a portion of iron wire or sheet 28 consists essentially of a $Fe_{16}N_2$ phase constitution. As used herein "consists essentially of" means that the iron wire or sheet 28 includes $Fe_{16}N_2$ and other materials that do not materially affect the basic and novel characteristics of the $Fe_{16}N_2$ phase. In other examples, iron wire or sheet 28 may include a $Fe_{16}N_2$ phase constitution and a $Fe_8N$ phase constitution, e.g., in different portions of iron wire or sheet 28. $Fe_8N$ phase constitution and $Fe_{16}N_2$ phase constitution in the wires and sheets and the later their pressed assemble may exchange-couple together magnetically through a working principle of quantum mechanics. This may form a so-called exchange-spring magnet, which may increase the magnetic energy product even just with a small portion of $Fe_{16}N$.

In some examples, as described in further detail below, iron wire or sheet 28 may include dopant elements or defects that serve as magnetic domain wall pinning sites, which may increase coercivity of iron wire or sheet 28. As used herein, an iron wire or sheet 28 that consists essentially of $Fe_{16}N_2$ phase constitution may include dopants or defects that serve as domain wall pinning sites. In other examples, as described in further detail below, iron wire or sheet 28 may include non magnetic dopant elements that serve as grain boundaries, which may increase coercivity of iron wire or sheet. As used herein, an iron wire or sheet 28 that consists of $Fe_{16}N_2$ phase constitution may include non magnetic elements that serve as grain boundaries.

Once the annealing process has been completed, iron wire or sheet 28 may be cooled under an inert atmosphere, such as argon, to reduce or prevent oxidation.

In some examples, iron wire or sheet 28 may not be a sufficient size for the desired application. In such examples, multiple iron wire or sheets 28 may be formed (each including or consisting essentially of a $Fe_{16}N_2$ phase constitution) and the multiple iron wire or sheets 28 may be pressed together to form a larger permanent magnet that includes or consists essentially of a $Fe_{16}N_2$ phase constitution (18).

Figures 5A, 5B:
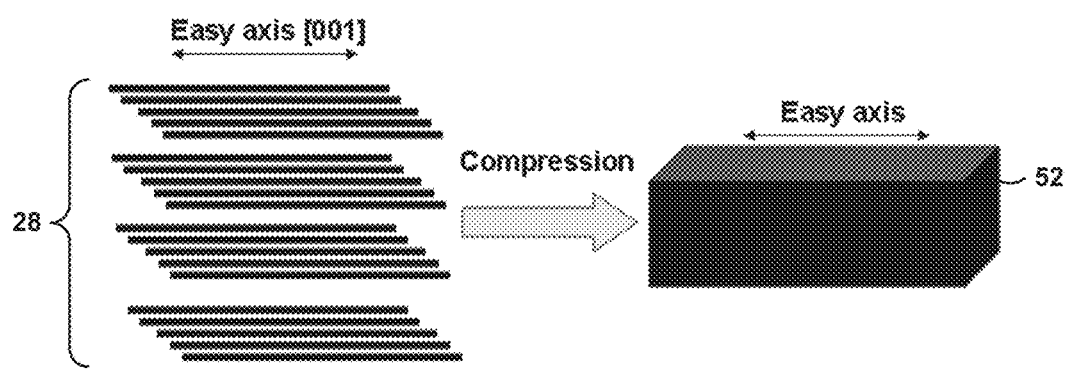
FIGS. 5A and 5B are conceptual diagrams that illustrate an example of the compression process for combining multiple iron wires or sheets into a permanent magnet.

FIGS. 5A and 5B are conceptual diagrams that illustrate an example of the compression process. As shown in FIG. 5A, multiple iron wire or sheets 28 are arranged such that the <001> axes of the respective iron wire or sheets 28 are substantially aligned. In examples in which the <001> axes of the respective iron wire or sheets 28 are substantially parallel to a long axis of the wire or sheet 28, substantially aligning the iron wire or sheets 28 may include overlying one iron wire or sheet 28 on another iron wire or sheet 28. Aligning the <001> axes of the respective iron wires or sheets 28 may provide uniaxial magnetic anisotropy to permanent magnet 52.

The multiple iron wires or sheets 28 may be compressed using, for example, cold compression or hot compression. In some examples, the temperature at which the compression is performed may be below about 300° C., as $Fe_{16}N_2$ may begin to degrade above about 300° C. The compression may be performed at a pressure and for a time sufficient to join the multiple iron wires or sheets 28 into a substantially unitary permanent magnet 52, as shown in FIG. 5B.

Any number of iron wires or sheets 28 may be pressed together to form permanent magnet 52. In some examples, permanent magnet 52 has a size in at least one dimension of at least 0.1 mm. In some examples, permanent magnet 52 has a size in at least one dimension of at least 1 mm. In some examples, permanent magnet 52 has a size in at least one dimension of at least 1 cm.

In some examples, in order to provide desirable high coercivity, it may be desirable to control magnetic domain movement within iron wire or sheet 28 and/or permanent magnet 52. One way in which magnetic domain movement may be controlled is through introduction of magnetic domain wall pinning sites into iron wire or sheet 28 and/or permanent magnet 52. In some examples, magnetic domain wall pinning sites may be formed by introducing defects into the iron crystal lattice. The defects may be introduced by injecting a dopant element into the iron crystal lattice or through mechanical stress of the iron crystal lattice. In some examples, the defects may be introduced into the iron crystal lattice before introduction of nitrogen and formation of the $Fe_{16}N_2$ phase constitution. In other examples, the defects may be introduced after annealing iron wire or sheet 28 to form $Fe_{16}N_2$ (16). One example by which defects that serve as domain wall pinning sites may be introduced into iron wire or sheet 28 may be ion bombardment of boron (B), copper (Cu), carbon (C), silicon (Si), or the like, into the iron crystal lattice. In other examples, powders consisting of non magnetic elements or compounds (e.g. Cu, Ti, Zr, Ta, $SiO_2$, $Al_2O_3$, etc) may be pressed together with the iron wires and sheets that comprising of $Fe_{16}N_2$ phase. Those non magnetic powders, with the size ranging from several nanometers to several hundred nanometers, function as the grain boundaries for $Fe_{16}N_2$ phase after pressing process. Those grain boundaries may enhance the coercivity of the permanent magnet.

Although described with regard to iron nitride, one or more of the examples processes describe herein may also apply to FeCo alloy to form single crystal or highly textured FeCo wires and sheets. Co atoms may replace part of Fe atoms in Fe lattice to enhance the magnetocrystalline anisotropy. Additionally, one or more of the examples strained diffusion processes described herein may also apply to these FeCo wires and sheets. Furthermore, one or more of the examples processes may also apply to diffuse Carbon (C), Boron (B) and Phosphorus (P) atoms into Fe or FeCo wires and sheets, or partially diffuse C, P, B into Fe or FeCo wires and sheets together with N atoms. Accordingly, the methods described herein may also apply to FeCo alloy to form single crystal or highly textured FeCo wires and sheets. Also, Co atoms may replace part of Fe atoms in Fe lattice, e.g., to enhance the magnetocrystalline anisotropy. Further, the method described herein may also apply to diffuse Carbon (C), Boron (B) and Phosphorus (P) atoms into Fe or FeCo wires and sheets, or partially diffuse C, P, B into Fe or FeCo wires and sheets together with N atoms. Moreover, the iron used for the processes described herein may take the shape of wire, sheet, or bulk form.

Example

Figure 12:
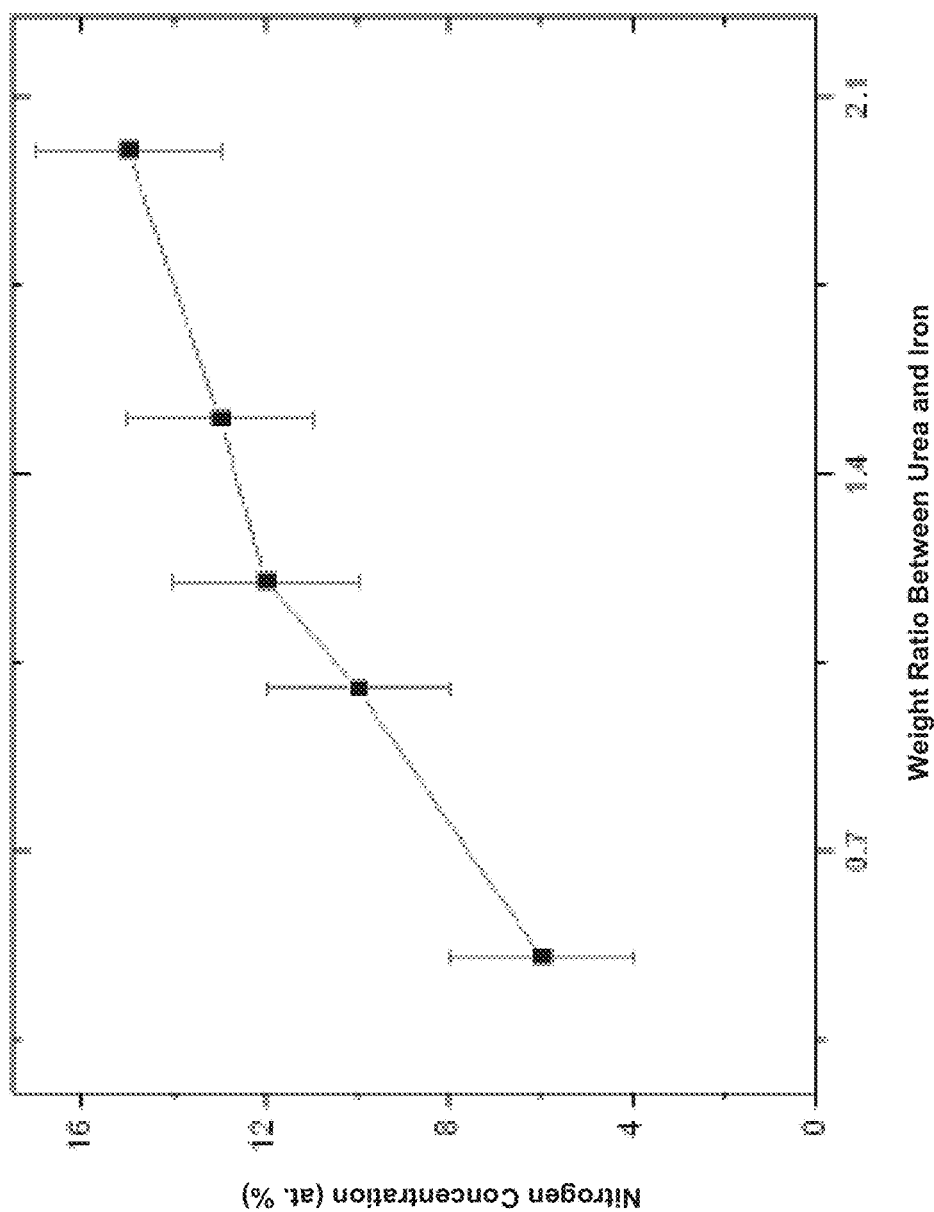

A series of experiments were carried out to evaluate one or more aspects of example iron nitride materials described herein. In particular, various examples iron nitride materials were formed via urea diffusion and then evaluated. The weight ratio of urea to bulk iron was varied to determine the dependence of the constitution of iron nitride material on this ratio. As shown in FIG. 12, five different examples were formed using urea to iron weight ratios of approximately 0.5 (i.e., 1:2), 1.0, 1.2, 1.6, and 2.0.

For reference, at temperatures above approximately 1573° C., the main chemical reaction process for the described urea diffusion process is:

$$CO(NH_2)_2 \rightarrow NH_3 + HNCO \qquad (1)$$

$$HNCO + H_2O \rightarrow 2NH_3 + CO_2 \qquad (2)$$

$$2NH_3 \rightarrow 2N + 3H_2 \qquad (3)$$

$$2N \rightarrow N_2 \qquad (4)$$

Figure 9:
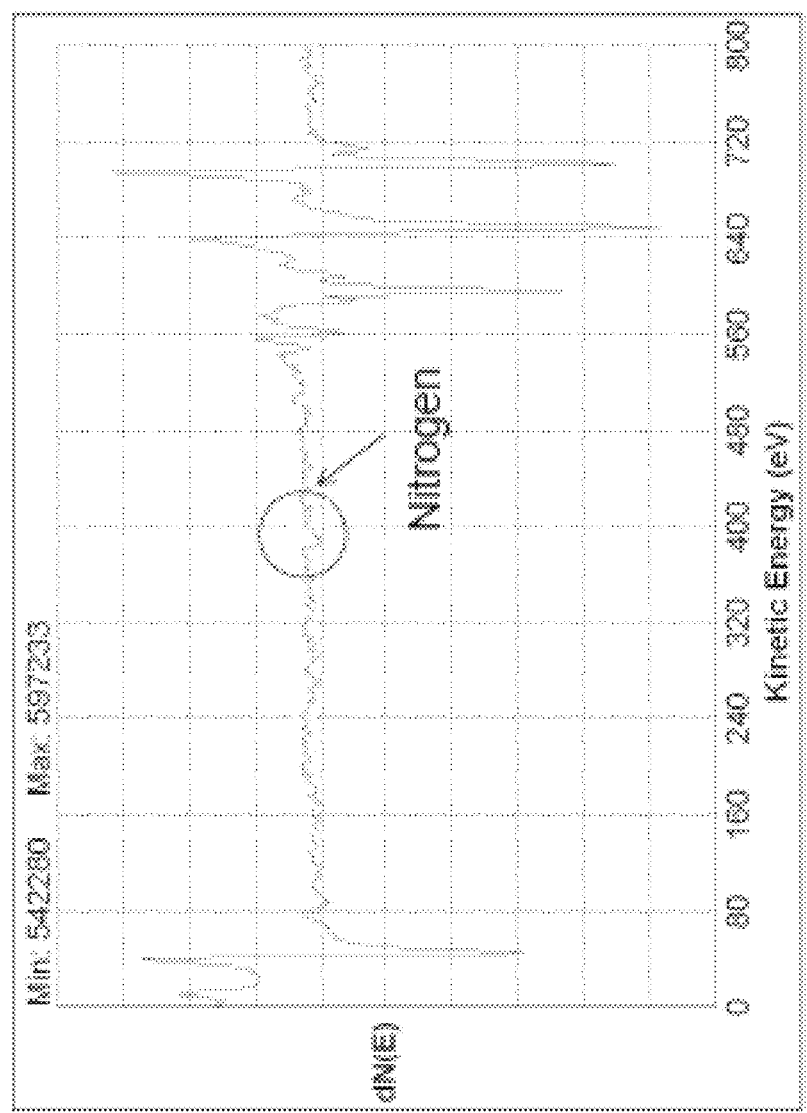
FIGS. 9-12 are graphs of various results for example experiments carried out to illustrate aspects of the disclosure.

In such a reaction process, for the nitrogen atom, it may be relatively easy to recombine into a molecule, as shown in equation (4). Accordingly, in some examples, the recombination of nitrogen atoms may be decreased by placing the urea next to or proximate to the bulk iron material during a urea diffusion process. For example, in some cases, the urea may be in direct contact with the surface of the bulk iron material, or within approximately 1 centimeter of the bulk material The iron nitride samples were prepared according to the urea diffusion process described herein. Following the preparation of the iron nitride sample via the urea diffusion process, Auger electron spectroscopy was used to determine the chemical composition on the surface of the example iron materials. FIG. 9 is a plot of the Auger measurement results for one of the examples, which indicates the presence of nitrogen in the material.

FIG. 12 is plot of weight ratio of urea to bulk iron material used in the urea diffusion process versus nitrogen concentration (at. %) of the final iron nitride material. As noted above, ratios of 0.5 (i.e., 1:2), 1.0, 1.2, 1.6, and 2.0 for urea to bulk iron material where used. As shown in FIG. 12, different weight ratios of urea to iron may lead to different nitrogen concentrations within the iron nitride material following urea diffusion. In particular, FIG. 12 illustrates that the atomic ratio of nitrogen in the iron nitride material increased as the amount of urea used relative to the amount bulk iron increased. Accordingly, in at least some cases, the desired nitrogen concentration of an iron nitride material formed via urea diffusion may be obtained by using the weight ratio of urea to iron in the starting material corresponding to the desired nitrogen concentration.

Figure 10:
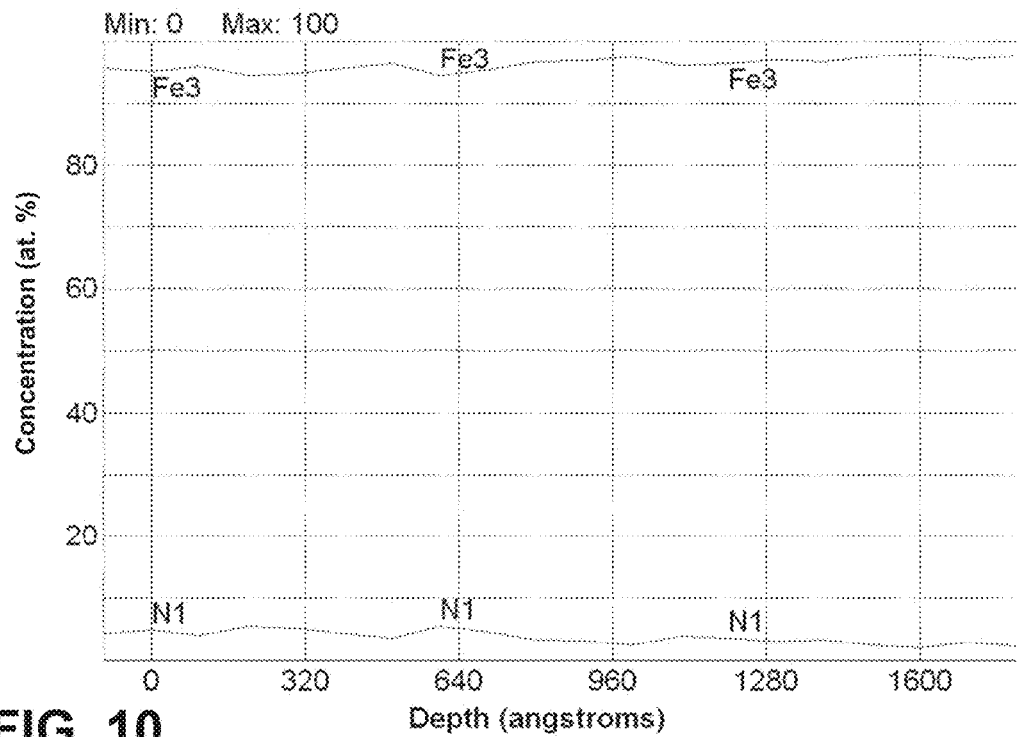

FIG. 10 is plot of depth below the surface of the iron nitride material versus concentration (at. %) for the iron nitride material formed via urea diffusion starting with a weight ratio of urea to iron of approximately 2.0. As shown in FIG. 10, the concentration of nitrogen from the surface of the iron nitride material to approximately 1600 angstroms below the surface of the material was approximately 6 at. %. Moreover, there isn't any trace for oxygen and carbon, which means that other dopant source(s) have been diminished effectively.

Figure 11:
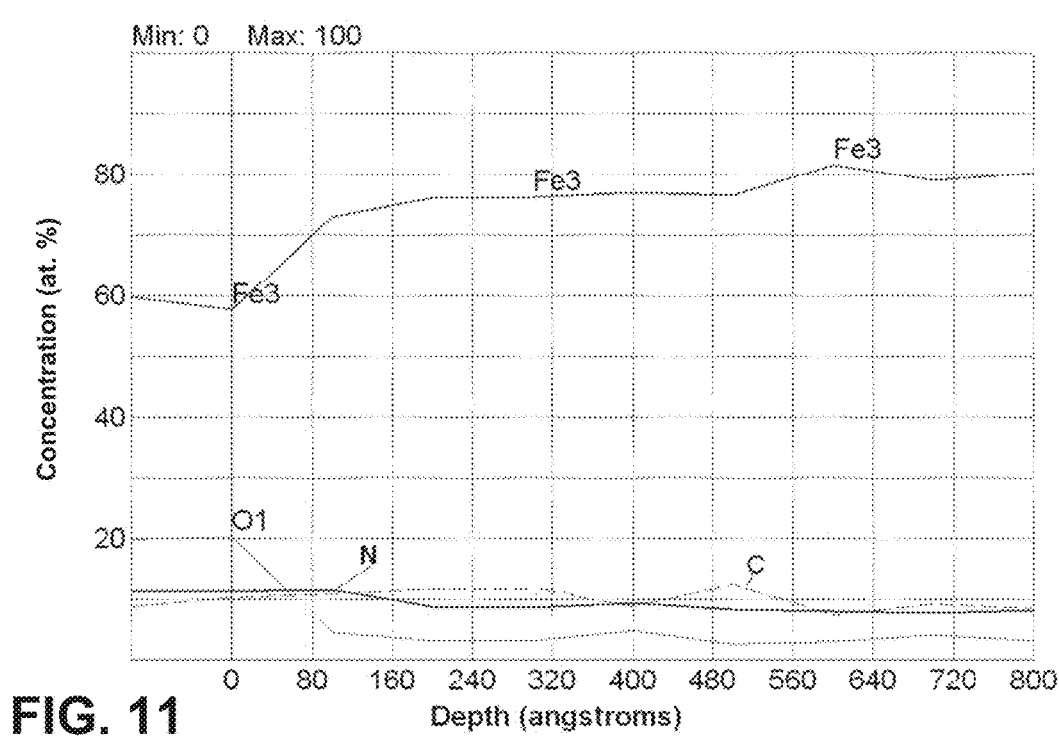

FIG. 11 is a plot of depth below the surface of the iron nitride material versus concentration (at. %) for the iron nitride material formed via urea diffusion starting with a weight ratio of urea to iron of approximately 1.0. As shown in FIG. 11, the concentration of nitrogen from the surface of the iron nitride material to approximately 800 angstroms below the surface of the material was approximately 6-12 at. %. In some examples, the concentration could be reduced further by improving the vacuum system, e.g., such as using pumping system to cause greater flow. As also show, oxygen has been diminished to be about 4 at. %. Although there is over 10 at. % carbon, since it can be considered a substitute element for nitrogen, it has no significant negative effect on the fabricated permanent magnet.

One example method comprises straining an iron wire or sheet comprising at least one iron crystal in a direction substantially parallel to a <001> crystal axis of the iron crystal to distort a unit cell structure of the at least one iron crystal and form a distorted unit cell structure having an increased length along the <001> crystal axis. The method further comprises nitridizing the iron wire or sheet to form a nitridized iron wire or sheet, and annealing the nitridized iron wire or sheet to form a Fe16N2 phase constitution at least a portion of the nitridized iron wire or sheet.

In the example method, straining the iron wire or sheet comprising the at least one iron crystal in the direction substantially parallel to the <001> crystal axis of the iron crystal may comprise applying a tensile force to the iron wire or sheet by pulling a first end of the iron wire or sheet in a first direction and pulling the second end of the iron wire or sheet in a second direction substantially opposite to the first direction.

In the example method, heating the iron wire or sheet to a temperature between about 125° C. and about 600° C. may comprise heating the iron wire or sheet to a temperature of about 125° C. for about 8.85 hours.

In the example method, heating the iron wire or sheet to a temperature of between about 125° C. and about 600° C.

may comprise heating the iron wire or sheet to a temperature of about 600° C. for about 2.4 hours.

In the example method, nitridizing the iron wire or sheet to form the nitridized iron wire or sheet may comprise exposing the iron wire or sheet to an atomic nitrogen substance.

In the example method, the nitrogen precursor may be mixed with a carrier gas. The nitrogen precursor may be mixed with the carrier gas to a partial pressure of between about 0.02 and about 0.1.

In the example method, exposing the iron wire or sheet to the atomic nitrogen substance may comprise exposing the iron wire or sheet to a nitrogen precursor at a pressure between about 0.133 Pa and about 1333 Pa.

In the example method, annealing the nitridized iron wire or sheet to form the $Fe_{16}N_2$ phase constitution in at least the portion of the nitridized iron wire or sheet may comprise heating the nitridized iron wire or sheet to between about 100° C. and about 300° C. for between about 20 hours and about 100 hours.

In the example method, annealing the nitridized iron wire or sheet to form the $Fe_{16}N_2$ phase constitution in at least the portion of the nitridized iron wire or sheet may comprise annealing the nitridized iron wire or sheet under an inert atmosphere.

The example method may further comprise compressing a plurality of nitridized iron wires or sheets comprising a $Fe_{16}N_2$ phase constitution to form a permanent magnet comprising a $Fe_{16}N_2$ phase constitution.

In the example method, compressing the plurality of nitridized iron wires or sheets may comprise the $Fe_{16}N_2$ phase constitution to form the permanent magnet comprising the $Fe_{16}N_2$ phase constitution comprises cold compressing the plurality of nitridized iron wires or sheets comprising the $Fe_{16}N_2$ phase constitution to form the permanent magnet comprising the $Fe_{16}N_2$ phase constitution.

In the example method, compressing the plurality of nitridized iron wires or sheets comprising the $Fe_{16}N_2$ phase constitution to form the permanent magnet comprising the $Fe_{16}N_2$ phase constitution may comprise substantially aligning a <001> crystal axis of a first nitridized iron wire or sheet comprising the $Fe_{16}N_2$ phase constitution with a <001> crystal axis of a second nitridized iron wire or sheet comprising the $Fe_{16}N_2$ phase constitution prior to compressing the first nitridized iron wire or sheet and the second iron wire or sheet.

In the example method, compressing the plurality of nitridized iron wires or sheets comprising the $Fe_{16}N_2$ phase constitution to form the permanent magnet comprising the $Fe_{16}N_2$ phase constitution may comprise compressing the plurality of nitridized iron wires or sheets comprising the $Fe_{16}N_2$ phase constitution to form the permanent magnet comprising the $Fe_{16}N_2$ phase constitution and defining a size in at least one dimension of at least 0.1 mm.

In the example method, compressing the plurality of nitridized iron wires or sheets comprising the $Fe_{16}N_2$ phase constitution to form the permanent magnet comprising the $Fe_{16}N_2$ phase constitution may comprise compressing the plurality of nitridized iron wires or sheets comprising the $Fe_{16}N_2$ phase constitution to form the permanent magnet comprising the $Fe_{16}N_2$ phase constitution and defining a size in at least one dimension of at least 1 mm.

In the example method, nitridizing the iron wire or sheet to form the nitridized iron wire or sheet may comprise exposing the iron wire or sheet to an atomic nitrogen substance, wherein the atomic nitrogen substance is formed from urea.

In the example method, introducing magnetic domain wall pinning sites into the nitridized iron wire or sheet may comprise ion bombarding the nitridized iron wire or sheet with a dopant element.

In one example, a system comprises a strain inducing apparatus configured to exert a strain on an iron wire or sheet comprising at least one body centered cubic (bcc) iron crystal in a direction substantially parallel to a <001> axis of the bcc iron crystal, a first heating apparatus configured to heat the strained iron wire or sheet, a source of an atomic nitrogen substance configured to expose the strained iron wire or sheet to the atomic nitrogen substance to form a nitridized iron wire or sheet, and a second heating apparatus configured to heat the nitridized iron wire or sheet to a temperature sufficient to anneal the nitridized iron wire or sheet to form a $Fe_{16}N_2$ phase constitution in at least a portion of the nitridized iron wire or sheet.

The example system may further comprises a press configured to compress a plurality of nitridized iron wire or sheets comprising a $Fe_{16}N_2$ phase constitution to form a substantially unitary permanent magnet including a $Fe_{16}N_2$ phase constitution.

The press may be configured to compress a plurality of nitridized iron wires or sheets comprising the $Fe_{16}N_2$ phase constitution to form a substantially unitary permanent magnet including the $Fe_{16}N_2$ phase constitution and defining a size in at least one dimension of at least 0.1 mm.

The press may be configured to compress a plurality of nitridized iron wires or sheets comprising the $Fe_{16}N_2$ phase constitution to form a substantially unitary permanent magnet including the $Fe_{16}N_2$ phase constitution and defining a size in at least one dimension of at least 1 mm.

The source of the atomic nitrogen substance may comprise urea.

The example system may further comprise means for introducing magnetic domain wall pinning sites into the nitridized iron wire or sheet.

The strain inducing apparatus may comprise a first roller configured to receive a first end of the iron wire or sheet and a second roller configured to receive a second end of the iron wire or sheet, wherein the second end is substantially opposite the first end, and wherein the first roller and the second roller are configured to rotate to apply a tensile force between the first end of the iron wire or sheet and the second end of the iron wire or sheet.

The first roller and the second roller are configured to rotate to strain the iron wire or sheet between about 0.3% and about 7.0%.

The first heating apparatus may comprise, for example, a crucible heating stage, a radiation heat source or a plasma arc lamp.

The second heating apparatus may comprise, for example, a heating crucible, radiation heat source, a plasma arc lamp, an oven or a closed retort.

In one example, a permanent magnet comprises a wire comprising a $Fe_{16}N_2$ phase constitution. In the example permanent magnet, the wire may have a diameter of at least about 0.01 millimeters. In other examples, the wire may have a diameter of about 0.1 millimeters.

In the example permanent magnet, the wire may have an energy product of greater than about 30 MGOe. In other examples, the wire has an energy product of greater than about 60 MGOe. In other examples, the wire has an energy product of greater than about 65 MGOe. In other examples, the wire has an energy product of greater than about 100 MGOe. In other examples, the wire has an energy product of between about 60 MGOe and about 135 MGOe.

In the example permanent magnet, the wire defines a major axis extending from a first end of the wire to a second end of the wire, wherein the wire comprises at least one body centered tetragonal (bct) iron nitride crystal, and wherein a <001> axis of the at least one bct iron nitride crystal is substantially parallel to the major axis of the wire.

In one example, the permanent magnet may comprise at least one magnetic domain wall pinning site.

The example permanent magnet may further comprise a phase stabilization dopant element comprising at least one of Ti, Co, Ti, Ta, Ni, Mn, Zr, Mo, Nb, Nd, Ga, Ge, C, B, Si, P, Cr, Cu, or Zn.

In one example, the wire of the permanent magnet comprises a $Fe_8N$ phase constitution. In another example, the wire of the permanent magnet consists essentially of the $Fe_{16}N_2$ phase constitution.

In another example, a permanent magnet comprises a sheet comprising a $Fe_{16}N_2$ phase constitution.

In some examples, the sheet may have a thickness of at least about 0.01 millimeters. In other examples, the sheet has a thickness of about 0.1 millimeters.

The sheet may have an energy product of greater than about 30 MGOe. In other examples, the sheet may have an energy product of greater than about 60 MGOe. In other examples, the sheet has an energy product of greater than about 65 MGOe. In other examples, the sheet has an energy product of greater than about 100 MGOe. In other examples, the sheet has an energy product of between about 60 MGOe and about 135 MGOe.

In examples of the permanent magnet, the sheet defines a major axis extending from a first end of the sheet to a second end of the sheet, wherein the sheet comprises at least one body centered tetragonal (bct) iron nitride crystal, and wherein a <001> axis of the at least one bct iron nitride crystal is substantially parallel to the major axis of the sheet.

In examples of the permanent magnet, the sheet further comprises a $Fe_8N$ phase constitution.

In examples of the permanent magnet, the sheet consists essentially of the $Fe_{16}N_2$ phase constitution.

In another example, a permanent magnet comprises a $Fe_{16}N_2$ phase constitution, wherein the permanent magnet has a size in at least one dimension of at least 0.1 mm. In some examples, the permanent magnet has a size in at least one dimension of at least 1 mm. In some examples, the permanent magnet has a size in at least one dimension of at least 1 cm.

The permanent magnet may have an energy product of greater than about 30 MGOe. In other examples, the permanent magnet may have an energy product of greater than about 60 MGOe. In other examples, the permanent magnet may have an energy product of greater than about 65 MGOe. In other examples, the permanent magnet may have an energy product of greater than about 100 MGOe. In other examples, the permanent magnet may have an energy product of between about 60 MG*Oe and about 135 MG*Oe.

The permanent magnet may comprise a $Fe_8N$ phase constitution. In another example, the permanent magnet consists essentially of the $Fe_{16}N_2$ phase constitution.

Another example method comprises nitridizing a metallic member via a urea diffusion process.

In one example, nitridizing a metallic member via the urea diffusion comprises heating urea and the metallic member together within a chamber to a temperature selected to decompose nitrogen atoms of the urea, wherein the nitrogen atoms diffuse into the metallic member within the chamber.

The metallic member may comprise iron. In another example, the metallic member consists essentially of iron. In one example, a ratio of urea to iron is selective such that, after the urea diffusion process, the metallic member consists essentially of the $Fe_{16}N_2$ phase constitution.

Various examples have been described. These and other examples fall within the scope of the following claims.

What is claimed is:

1. A method comprising:
   straining an iron wire or sheet comprising at least one iron crystal in a direction parallel to a <001> crystal axis of the at least one iron crystal to distort a unit cell structure of the at least one iron crystal and form a distorted unit cell structure having an increased length along the <001> crystal axis;
   while straining the iron wire or sheet, nitridizing the iron wire or sheet to form a nitridized iron wire or sheet; and
   annealing the nitridized iron wire or sheet to form a Fe16N2 phase constitution in at least a portion of the nitridized iron wire or sheet.

2. The method of claim 1, wherein the iron wire or sheet comprises a single iron crystal structure or textured structure.

3. The method of claim 1, wherein the iron wire or sheet comprises a plurality of iron crystals, and wherein straining the iron wire or sheet comprising the at least one iron crystal in the direction parallel to the <001> crystal axis of the iron crystal comprises straining the iron wire or sheet comprising the plurality of iron crystals in a direction parallel to the <001> crystal axis of at least some of the plurality of iron crystals.

4. The method of claim 1, wherein the iron wire or sheet comprises the iron wire, wherein the iron wire defines a major axis, and wherein straining the iron wire or sheet comprising the at least one iron crystal in the direction parallel to the <001> crystal axis of the iron crystal comprises straining the iron wire in the direction parallel to the major axis of the iron wire.

5. The method of claim 1, wherein straining the iron wire or sheet comprising the at least one iron crystal in the direction parallel to the <001> crystal axis of the iron crystal comprises straining the iron wire or sheet comprising the at least one iron crystal in the direction parallel to the <001> crystal axis of the iron crystal to a strain of between about 0.3% and about 7%.

6. The method of claim 1, wherein nitridizing the iron wire or sheet to form the nitridized iron wire or sheet comprises:
   exposing the iron wire or sheet to an atomic nitrogen substance; and
   heating the iron wire or sheet to a temperature between about 125° C. and about 600° C.

7. The method of claim 6, wherein the atomic nitrogen substance is formed from a nitrogen precursor comprising at least one of N2 gas, NH3 gas, or urea.

8. The method of claim 1, wherein annealing the nitridized iron wire or sheet to form the Fe16N2 phase constitution in at least the portion of the nitridized iron wire or sheet comprises heating the nitridized iron wire or sheet to between about 100° C. and about 300° C. under an inert atmosphere.

9. The method of claim 1, further comprising introducing magnetic domain wall pinning sites into the nitridized iron wire or sheet comprising the Fe16N2 phase constitution.

10. The method of claim 9, wherein introducing magnetic domain wall pinning sites into the nitridized iron wire or sheet comprising the Fe16N2 phase constitution comprises ion bombarding the nitridized iron wire or sheet comprising the Fe16N2 phase constitution with a dopant element.

11. The method of claim 1, further comprising introducing magnetic domain wall pinning sites into the nitridized iron wire or sheet prior to straining the iron wire or sheet comprising the at least one iron crystal in the direction parallel to the <001> crystal axis of the iron crystal.

12. The method of claim 1, further comprising introducing a phase stabilization dopant element comprising at least one of Ti, Co, Ti, Ta, Ni, Mn, Zr, Mo, Nb, Nd, Ga, Ge, C, B, Si, P, Cr, Cu, or Zn into the iron wire or sheet.

13. The method of claim 1, wherein the distorted unit cell structure defines a body centered tetragonal (bct) iron crystal unit cell elongated along a <001> axis between about 0.3% and about 7% compared to an unstrained iron body centered cubic (bcc) crystal unit cell.

* * * * *

UNITED STATES PATENT AND TRADEMARK OFFICE
CERTIFICATE OF CORRECTION

PATENT NO.          : 10,068,689 B2
APPLICATION NO.     : 14/238835
DATED               : September 4, 2018
INVENTOR(S)         : Jian-Ping Wang et al.

It is certified that error appears in the above-identified patent and that said Letters Patent is hereby corrected as shown below:

In the Claims

Column 17, Line 8, after "at least one of" remove "Ti,".

Signed and Sealed this
Twentieth Day of November, 2018

Andrei Iancu
*Director of the United States Patent and Trademark Office*